(12) United States Patent
Tanaka et al.

(10) Patent No.: US 10,841,548 B2
(45) Date of Patent: Nov. 17, 2020

(54) OSCILLATING MIRROR ELEMENT AND PROJECTOR

(71) Applicants:Funai Electric Co., Ltd., Osaka (JP); National Institute of Advanced Industrial Science and Technology, Tokyo (JP)

(72) Inventors: Fuminori Tanaka, Daito (JP); Takeshi Inoda, Nara (JP); Ken Nishioka, Yokohama (JP); Jun Akedo, Tsukuba (JP)

(73) Assignees: FUNAI ELECTRIC CO., LTD., Osaka (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 30 days.

(21) Appl. No.: 15/444,399

(22) Filed: Feb. 28, 2017

(65) Prior Publication Data

US 2017/0257611 A1    Sep. 7, 2017

(30) Foreign Application Priority Data

Mar. 1, 2016 (JP) .................................. 2016-039367
Mar. 1, 2016 (JP) .................................. 2016-039368

(51) Int. Cl.
*H04N 9/31* (2006.01)
*G02B 26/08* (2006.01)
*G02B 26/10* (2006.01)

(52) U.S. Cl.
CPC ....... *H04N 9/3194* (2013.01); *G02B 26/0833* (2013.01); *G02B 26/0858* (2013.01); *G02B 26/101* (2013.01); *G02B 26/105* (2013.01); *H04N 9/3135* (2013.01)

(58) Field of Classification Search
CPC .... H04N 9/31–3197; G02B 26/00–129; G03B 21/00–64
See application file for complete search history.

(56) References Cited

U.S. PATENT DOCUMENTS

| 7,605,965 | B2 | 10/2009 | Tani et al. |
| 7,605,966 | B2 | 10/2009 | Tani et al. |
| 7,773,282 | B2 | 8/2010 | Tani et al. |
| 8,305,669 | B2 | 11/2012 | Akedo et al. |
| 8,379,283 | B2 | 2/2013 | Klose et al. |
| 8,422,109 | B2 | 4/2013 | Terada et al. |
| 9,448,402 | B2 | 9/2016 | Akanuma et al. |

(Continued)

FOREIGN PATENT DOCUMENTS

| CN | 101718910 A | 6/2010 |
| DE | 10 2008 049 647 A1 | 4/2010 |

(Continued)

*Primary Examiner* — Michelle M Iacoletti
*Assistant Examiner* — Christopher A Lamb, II
(74) *Attorney, Agent, or Firm* — Keating & Bennett, LLP

(57) ABSTRACT

An oscillating mirror element includes a mirror portion, a drive portion that drives the mirror portion, a strain sensor capable of detecting an amount of displacement of the mirror portion, and a base including a mirror beam portion provided with the mirror portion, a sensor beam portion provided with the strain sensor, and a body portion that supports the mirror beam portion and the sensor beam portion and is provided with the drive portion.

22 Claims, 9 Drawing Sheets

(56) References Cited

U.S. PATENT DOCUMENTS

| | | |
|---|---|---|
| 9,488,834 B2 | 11/2016 | Kobayashi |
| 2001/0051014 A1* | 12/2001 | Behin ................ G02B 26/0858 385/16 |
| 2007/0216982 A1 | 9/2007 | Sanders et al. |
| 2009/0185253 A1* | 7/2009 | Tani .................. G02B 26/0858 359/221.2 |
| 2010/0014140 A1* | 1/2010 | Akedo ............... G02B 26/0833 359/199.1 |
| 2010/0014143 A1* | 1/2010 | Kanno .................. B81B 3/004 359/224.1 |
| 2013/0083378 A1 | 4/2013 | Tanaka et al. |
| 2014/0293435 A1* | 10/2014 | Kobayashi ......... G02B 27/0101 359/631 |
| 2015/0316762 A1* | 11/2015 | Hambeck ............. G02B 26/085 359/199.1 |
| 2016/0004071 A1 | 1/2016 | Mizoguchi |
| 2016/0018256 A1 | 1/2016 | Mushimoto et al. |
| 2016/0119596 A1* | 4/2016 | Ikeno ................ G02B 26/0833 348/205 |
| 2017/0235128 A1* | 8/2017 | Brioschi ................. B81B 7/008 359/198.1 |

FOREIGN PATENT DOCUMENTS

| | | |
|---|---|---|
| JP | 2008-514977 A | 5/2008 |
| JP | 2009-163154 A | 7/2009 |
| JP | 2009-169325 A | 7/2009 |
| JP | 2009-265560 A | 11/2009 |
| JP | 2012-073456 A | 4/2012 |
| JP | 2013-003526 A | 1/2013 |
| JP | 2013-092750 A | 5/2013 |
| JP | 5229704 B2 | 7/2013 |
| JP | 2013-225075 A | 10/2013 |
| JP | 2014-115612 A | 6/2014 |
| JP | 2014-197041 A | 10/2014 |
| JP | 2014-232179 A | 12/2014 |
| JP | 2016-014725 A | 1/2016 |
| JP | 2016-024316 A | 2/2016 |

* cited by examiner

FIRST (SECOND, THIRD) EMBODIMENT

FIRST EMBODIMENT

FIRST EMBODIMENT

SECOND EMBODIMENT

THIRD EMBODIMENT

FOURTH EMBODIMENT

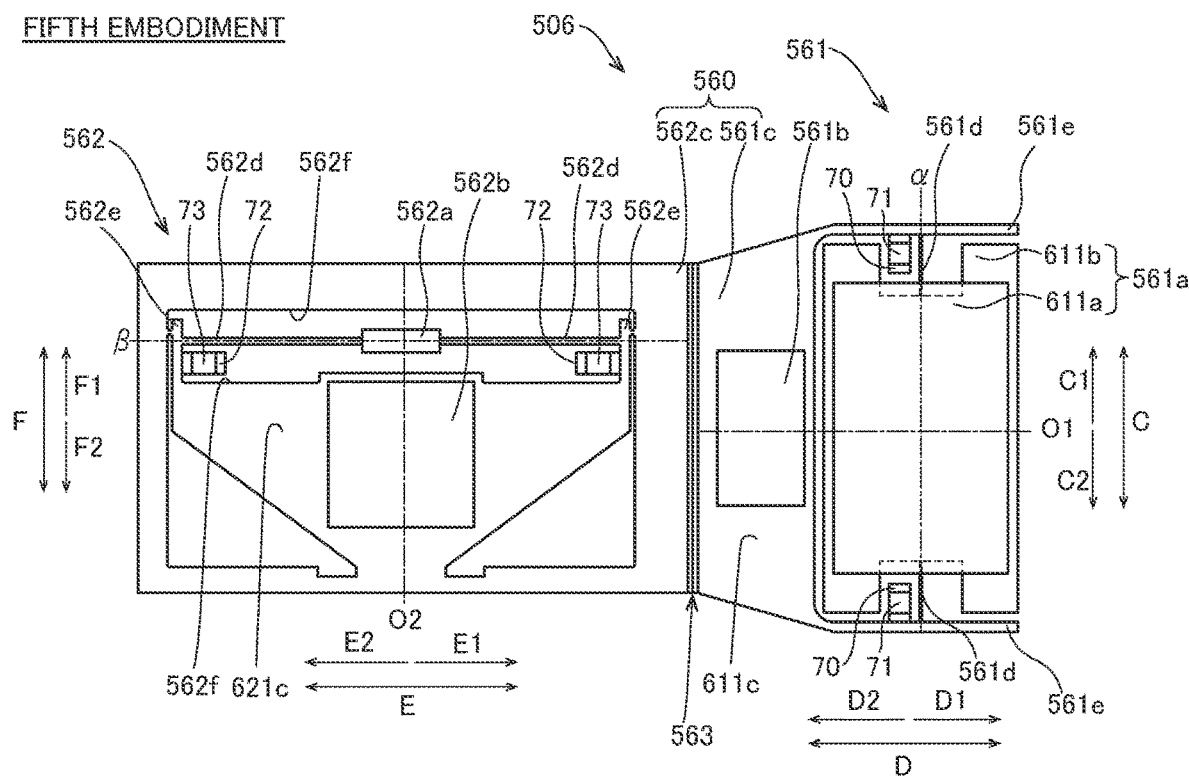
FIG.8 FIFTH EMBODIMENT
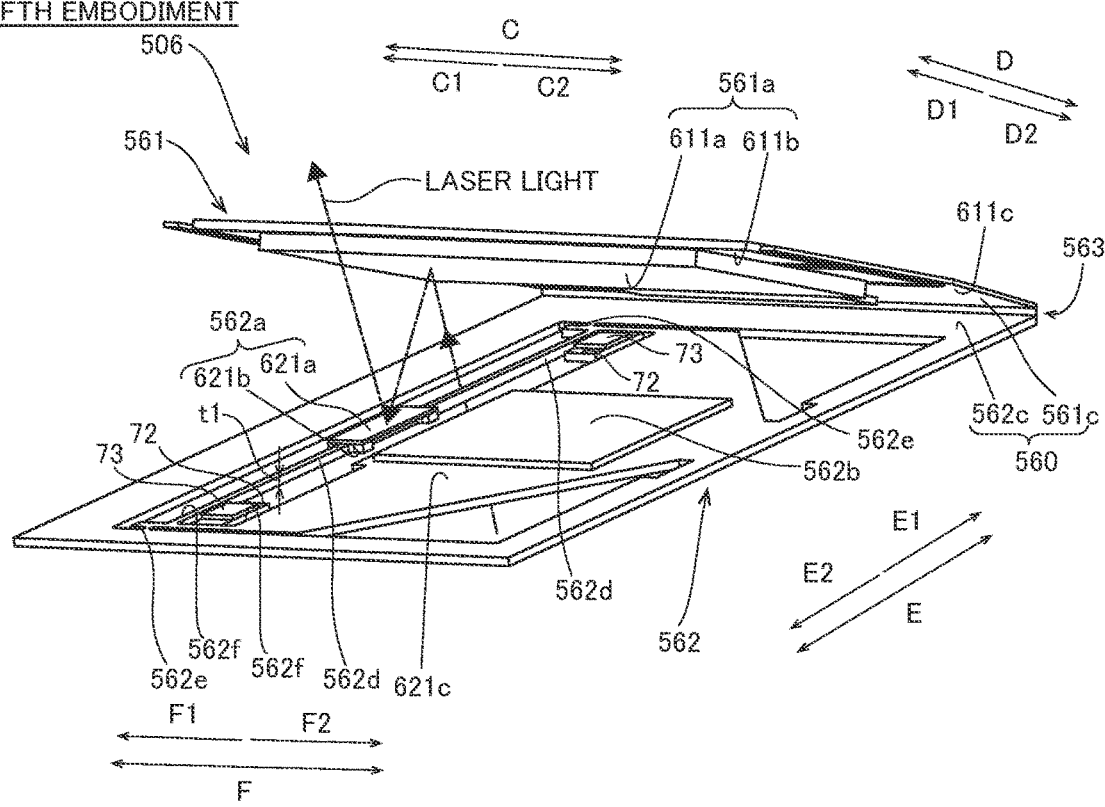
FIG.9 FIFTH EMBODIMENT

FIFTH EMBODIMENT

SIXTH EMBODIMENT

SIXTH EMBODIMENT

SIXTH EMBODIMENT

SEVENTH EMBODIMENT

MODIFICATION OF FIRST EMBODIMENT

MODIFICATION OF SECOND EMBODIMENT

MODIFICATION OF THIRD EMBODIMENT

OSCILLATING MIRROR ELEMENT AND PROJECTOR

CROSS-REFERENCE TO RELATED APPLICATIONS

The priority application numbers JP2016-039367, Oscillating Mirror Element and Projector, Mar. 1, 2016, Fuminori Tanaka, Takeshi Inoda, Ken Nishioka, and Jun Akedo, and JP2016-039368, Oscillating Mirror Element and Projector, Mar. 1, 2016, Takeshi Inoda and Jun Akedo, upon which this patent application is based, are hereby incorporated by reference.

BACKGROUND OF THE INVENTION

Field of the Invention

The present invention relates to an oscillating mirror element and a projector, and more particularly, it relates to an oscillating mirror element and a projector each including a strain sensor capable of detecting the amount of displacement of a mirror portion.

Description of the Background Art

An oscillating mirror element including a strain sensor capable of detecting the amount of displacement of a mirror portion is known in general, as disclosed in Japanese Patent Laying-Open No. 2014-115612, for example.

The aforementioned Japanese Patent Laying-Open No. 2014-115612 discloses an oscillating mirror element including a mirror portion, a drive portion that drives the mirror portion, a strain sensor that detects the amount of displacement of the mirror portion, and a base including a beam portion provided with the mirror portion. The drive portion is arranged on a fixed end portion (base portion) of the beam portion. The strain sensor is provided near the drive portion. The strain sensor is bonded to the base with an adhesive.

However, in the aforementioned Japanese Patent Laying-Open No. 2014-115612, the strain sensor is arranged near the drive portion, and hence an excessive stress that exceeds a detectable range is applied to the strain sensor when the drive portion is significantly displaced such that a stable output cannot be obtained from the strain sensor.

SUMMARY OF THE INVENTION

The present invention has been proposed in order to solve the aforementioned problem, and an object of the present invention is to provide an oscillating mirror element and a projector each capable of obtaining a stable output from a strain sensor.

An oscillating mirror element according to a first aspect of the present invention includes a mirror portion, a drive portion that drives the mirror portion, a strain sensor capable of detecting an amount of displacement of the mirror portion, and a base including a mirror beam portion provided with the mirror portion, a sensor beam portion provided with the strain sensor, and a body portion that supports the mirror beam portion and the sensor beam portion and is provided with the drive portion.

In the oscillating mirror element according to the first aspect of the present invention, as hereinabove described, the base includes the mirror beam portion provided with the mirror portion, the sensor beam portion provided with the strain sensor, and the body portion that supports the mirror beam portion and the sensor beam portion and is provided with the drive portion. Thus, the mirror portion, the strain sensor, and the drive portion are provided at predetermined positions of the mirror beam portion, the sensor beam portion, and the body portion, respectively, whereby the strain sensor can be spaced apart from the drive portion, and hence application of an excessive stress from the drive portion to the strain sensor can be significantly reduced or prevented. Furthermore, the dedicated sensor beam portion for providing the strain sensor can be provided, and hence attenuation of the oscillation of the mirror portion provided on the mirror beam portion caused by the adhesive of the strain sensor can be significantly reduced or prevented. Thus, a stable output can be obtained from the strain sensor while a reduction in the scan characteristics of the mirror portion is significantly reduced or prevented.

In the aforementioned oscillating mirror element according to the first aspect, the body portion of the base preferably includes an outer frame portion on which the mirror beam portion and the sensor beam portion are inwardly arranged, and a pair of beam support portions that supports the mirror beam portion and the sensor beam portion and has first ends extending toward the drive portion and second ends connected to the outer frame portion. According to this structure, the mirror beam portion provided with the mirror portion and the sensor beam portion provided with the strain sensor are supported by the same member, which is the pair of beam support portions, and hence a drive force can be efficiently transmitted from the drive portion to the mirror beam portion and the sensor beam portion through the pair of beam support portions.

In this case, the mirror beam portion is preferably connected to each of the pair of beam support portions, and the sensor beam portion is preferably connected to each of the pair of beam support portions. According to this structure, both the mirror beam portion and the sensor beam portion are double-supported beams (both-end supported beams), and hence the mirror portion and the strain sensor can be stably supported by the mirror beam portion and the sensor beam portion in a state where the mirror portion and the strain sensor are independent of each other.

In the aforementioned oscillating mirror element according to the first aspect, in a direction in which the mirror beam portion and the sensor beam portion are aligned, a width of the mirror beam portion is preferably narrower than a width of the sensor beam portion. According to this structure, the stiffness of the mirror beam portion becomes smaller than the stiffness of the sensor beam portion, and hence the mirror portion can swing more largely than the strain sensor.

In the aforementioned oscillating mirror element according to the first aspect, the mirror portion and the strain sensor are preferably arranged such that central positions thereof substantially coincide with each other in a direction in which the mirror beam portion extends.

According to this structure, the strain sensor is arranged at a position that corresponds to the mirror portion in the direction in which the mirror beam portion extends, and hence the amount of displacement of the mirror portion can be more accurately detected by the strain sensor.

In the aforementioned oscillating mirror element according to the first aspect, the sensor beam portion preferably includes a cantilever beam arranged substantially parallel to the mirror beam portion, and a length of the cantilever beam in a direction in which the cantilever beam extends is preferably shorter than a length of the mirror beam portion to the mirror portion. According to this structure, as compared with the case where the length in the direction in which the cantilever beam extends is longer than the length of the mirror beam portion to the mirror portion, the natural frequency of the mirror beam portion and the natural frequency of the cantilever beam can be moved away from each other, and hence unnecessary resonance between the mirror beam portion and the cantilever beam can be significantly reduced or prevented. Consequently, an unstable output from the strain sensor can be significantly reduced or prevented.

In this case, the length of the cantilever beam is preferably not more than one half of the length of the mirror beam portion to the mirror portion. According to this structure, the cantilever beam is further reduced in length, whereby unnecessary resonance between the mirror beam portion and the cantilever beam can be further significantly reduced or prevented. Consequently, an unstable output from the strain sensor can be further significantly reduced or prevented.

In the aforementioned oscillating mirror element according to the first aspect, the mirror beam portion is preferably arranged substantially parallel to the sensor beam portion. According to this structure, as compared with the case where the mirror beam portion is arranged obliquely to the sensor beam portion, a space in which the mirror beam portion and the sensor beam portion are arranged can be reduced. Therefore, the oscillating mirror element can be downsized.

In this case, the mirror beam portion is preferably arranged closer to the drive portion with respect to the sensor beam portion. According to this structure, as compared with the case where the sensor beam portion is arranged closer to the drive portion with respect to the mirror beam portion, the mirror portion can be arranged closer to the drive portion with respect to the strain sensor, and hence a drive force can be transmitted from the drive portion to the mirror portion with a low energy loss. Consequently, a large amount of displacement can be obtained in the mirror portion with a little drive force, and hence the scan characteristics of the mirror portion can be improved.

In the aforementioned oscillating mirror element according to the first aspect, the sensor beam portion preferably includes a pair of first portions and a second portion that connects the pair of first portions to each other and has a width different from a width of the pair of first portions. According to this structure, a portion having a small width or large width can be partially provided in the sensor beam portion due to the pair of first portions and the second portion. Consequently, the width of the second portion is adjusted such that the stiffness of the sensor beam portion can be controlled, and hence the amount of strain detected by the strain sensor can be easily kept within an optimum range for the strain sensor.

In this case, in a direction in which the mirror beam portion and the sensor beam portion are aligned, the width of the pair of first portions is preferably wider than the width of the second portion. According to this structure, the stiffness of the pair of first portions can be rendered larger than the stiffness of the second portion.

In the aforementioned oscillating mirror element according to the first aspect, the mirror beam portion, the sensor beam portion, and the body portion that supports the mirror beam portion and the sensor beam portion and is provided with the drive portion are preferably formed of a single member. According to this structure, the apparatus structure can be simplified. Furthermore, the mirror beam portion, the sensor beam portion, and the body portion are formed of the single member, and hence as compared with the case where the mirror beam portion, the sensor beam portion, and the body portion are formed of separate members, oscillation from the drive portion can be more effectively transmitted to the mirror beam portion and the sensor beam portion.

In the aforementioned oscillating mirror element according to the first aspect, the mirror portion preferably includes a first mirror portion that receives and reflects light from a light source portion and is driven to be swingable about a first axis and a second mirror portion that receives and reflects the light from the first mirror portion and is driven to be swingable about a second axis that extends in a direction substantially perpendicular to the first axis, the oscillating mirror element preferably further includes a first oscillating mirror element portion that includes the first mirror portion and a second oscillating mirror element portion that includes the second mirror portion, the base preferably includes a first surface provided with the first oscillating mirror element portion and a second surface provided with the second oscillating mirror element portion, and the mirror beam portion, the sensor beam portion, and the body portion are preferably provided in at least one of the first oscillating mirror element portion and the second oscillating mirror element portion. According to this structure, the oscillating mirror element can be configured such that the light from the light source portion can be scanned in a plurality of directions by the first oscillating mirror element portion and the second oscillating mirror element portion.

In this case, a fold angle between the first surface and the second surface of the base is preferably an acute angle. According to this structure, the light reflected by the first mirror portion can be directly irradiated to the second mirror portion without using a reflective plate to reflect the light reflected by the first mirror portion. Consequently, no reflective plate is used, whereby the structure can be simplified while optical deviation is significantly reduced or prevented. Furthermore, it is simply required to fold the single base made of metal, and hence a process for manufacturing the oscillating mirror element can be simplified.

In the aforementioned structure in which the fold angle between the first surface and the second surface is the acute angle, the base is preferably provided with a fold line to fold the base along a direction substantially parallel to the first axis. According to this structure, when the base is folded along the fold line, the light reflected by the swinging second mirror portion swings (is scanned) in a direction along the fold line in a planar view, and hence the light reflected by the second mirror portion does not swing in a direction toward the first mirror portion. Consequently, blocking (reflection) of light by the first mirror portion can be significantly reduced or prevented.

In the aforementioned structure in which the fold angle between the first surface and the second surface is the acute angle, the mirror beam portion preferably includes a first mirror beam portion that supports the first mirror portion such that the first mirror portion is driven to be swingable about the first axis and a second mirror beam portion that supports the second mirror portion such that the second mirror portion is driven to be swingable about the second axis, and a thickness of the first mirror beam portion is preferably thinner than a thickness of the second mirror beam portion. According to this structure, when the first oscillating mirror element portion is swingably driven by resonant oscillation, the resonance frequency can be reduced simply by reducing the thickness of the first mirror beam portion without separately providing a member to reduce the resonance frequency. Consequently, the structure of the oscillating mirror element can be simplified.

In the aforementioned structure in which the thickness of the first mirror beam portion is thinner than the thickness of the second mirror beam portion, weights of the first oscillating mirror element portion at one side and the other side in a thickness direction of the base centered on the first axis are preferably substantially equal to each other. According to this structure, even when the thickness of the first mirror beam portion is reduced in order to reduce the resonance frequency, deviation between the first axis and the central axis of swinging of the first oscillating mirror element portion can be significantly reduced or prevented, and hence poor balance of the swinging of the first oscillating mirror element portion can be significantly reduced or prevented.

In the aforementioned structure in which the fold angle between the first surface and the second surface is the acute angle, the mirror beam portion preferably includes a first mirror beam portion that supports the first mirror portion such that the first mirror portion is driven to be swingable about the first axis, the base is preferably provided with a fold line to fold the base along a direction substantially parallel to the first axis, the drive portion preferably includes a first drive portion placed on the first oscillating mirror element portion and arranged between the fold line and the first mirror portion and a second drive portion placed on the second oscillating mirror element portion, and the first drive portion preferably resonantly drives the first mirror beam portion. According to this structure, a dead space between the fold line and the first mirror portion can be effectively utilized, and hence the oscillating mirror element cab be downsized.

In the aforementioned structure in which the fold angle between the first surface and the second surface is the acute angle, the mirror beam portion preferably includes a first mirror beam portion that supports the first mirror portion such that the first mirror portion is driven to be swingable about the first axis, the drive portion preferably includes a first drive portion placed on the first oscillating mirror element portion and a second drive portion placed on the second oscillating mirror element portion, and the first drive portion is preferably arranged near the first mirror beam portion that supports the first mirror portion such that the first mirror portion is swingably driven, and preferably does not resonantly drive but directly drives the first mirror beam portion. According to this structure, the first oscillating mirror element portion can be swung at a constant speed according to the drive frequency. Furthermore, the size of the first mirror portion can be further reduced with direct drive than resonant drive, and hence the oscillating mirror element can be reduced in weight.

In the aforementioned oscillating mirror element according to the first aspect, the base preferably includes an opening provided near the second mirror portion, the light from the light source portion preferably passes through the opening from a surface side of the second oscillating mirror element portion opposite to a surface on which the second mirror portion is provided to be irradiated to the first mirror portion, and the light reflected by the first mirror portion is preferably directly irradiated to the second mirror portion. According to this structure, the light from the light source portion can be irradiated to the first mirror portion through the opening without using a reflective plate, and the light reflected by the first mirror portion can be irradiated to the second mirror portion without using the reflective plate. Consequently, no reflective plate is used, whereby the structure can be simplified while optical deviation is significantly reduced or prevented.

A projector according to a second aspect of the present invention includes a light source portion, a mirror portion that reflects projection light from the light source portion, a drive portion that drives the mirror portion, a strain sensor capable of detecting an amount of displacement of the mirror portion, and a base including a mirror beam portion provided with the mirror portion, a sensor beam portion provided with the strain sensor, and a body portion that supports the mirror beam portion and the sensor beam portion and is provided with the drive portion.

In the projector according to the second aspect of the present invention, as hereinabove described, the base includes the mirror beam portion provided with the mirror portion, the sensor beam portion provided with the strain sensor, and the body portion that supports the mirror beam portion and the sensor beam portion and is provided with the drive portion. Thus, the mirror portion, the strain sensor, and the drive portion are provided at predetermined positions of the mirror beam portion, the sensor beam portion, and the body portion, respectively, whereby the strain sensor can be spaced apart from the drive portion, and hence application of an excessive stress from the drive portion to the strain sensor can be significantly reduced or prevented. Furthermore, the dedicated sensor beam portion for providing the strain sensor can be provided, and hence attenuation of the oscillation of the mirror portion provided on the mirror beam portion caused by the adhesive of the strain sensor can be significantly reduced or prevented. Thus, a stable output can be obtained from the strain sensor while a reduction in the scan characteristics of the mirror portion is significantly reduced or prevented.

The aforementioned projector according to the second aspect preferably further includes an analyzer that analyzes a frequency component of a detection signal detected by the strain sensor, and the projector preferably stops emission of the projection light from the light source portion when a frequency component other than a predetermined frequency component is detected in the analyzer. According to this structure, the analyzer can promptly know the failure of the mirror portion or the like that causes the frequency component other than the predetermined frequency component to be detected, and hence the emission of the projection light from the light source portion can be promptly stopped.

In the aforementioned projector according to the second aspect, the mirror portion preferably includes a first mirror portion that receives and reflects the projection light from the light source portion and is driven to be swingable about a first axis and a second mirror portion that receives and reflects the projection light from the first mirror portion and is driven to be swingable about a second axis that extends in a direction substantially perpendicular to the first axis, the projector preferably further includes a first oscillating mirror element portion that includes the first mirror portion and a second oscillating mirror element portion that includes the second mirror portion, the base preferably includes a first surface provided with the first oscillating mirror element portion and a second surface provided with the second oscillating mirror element portion, and the mirror beam portion, the sensor beam portion, and the body portion are preferably provided in at least one of the first oscillating mirror element portion and the second oscillating mirror element portion. According to this structure, the projector can be configured such that the light from the light source portion can be scanned in a plurality of directions by the first oscillating mirror element portion and the second oscillating mirror element portion.

In this case, a fold angle between the first surface and the second surface of the base is preferably an acute angle. According to this structure, the projection light reflected by the first mirror portion can be directly irradiated to the second mirror portion without using a reflective plate to reflect the projection light reflected by the first mirror portion. Consequently, no reflective plate is used, whereby the structure can be simplified while optical deviation is significantly reduced or prevented. Furthermore, it is simply required to fold the single base made of metal, and hence a process for manufacturing the projector can be simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a plan view showing an oscillating mirror element of the projector according to the fifth embodiment of the present invention;

FIG. 9 is a perspective view showing the oscillating mirror element of the projector according to the fifth embodiment of the present invention;

DESCRIPTION OF THE PREFERRED EMBODIMENTS

Embodiments of the present invention are now described with reference to the drawings.

First Embodiment (Structure of Projector)

Figure 2:
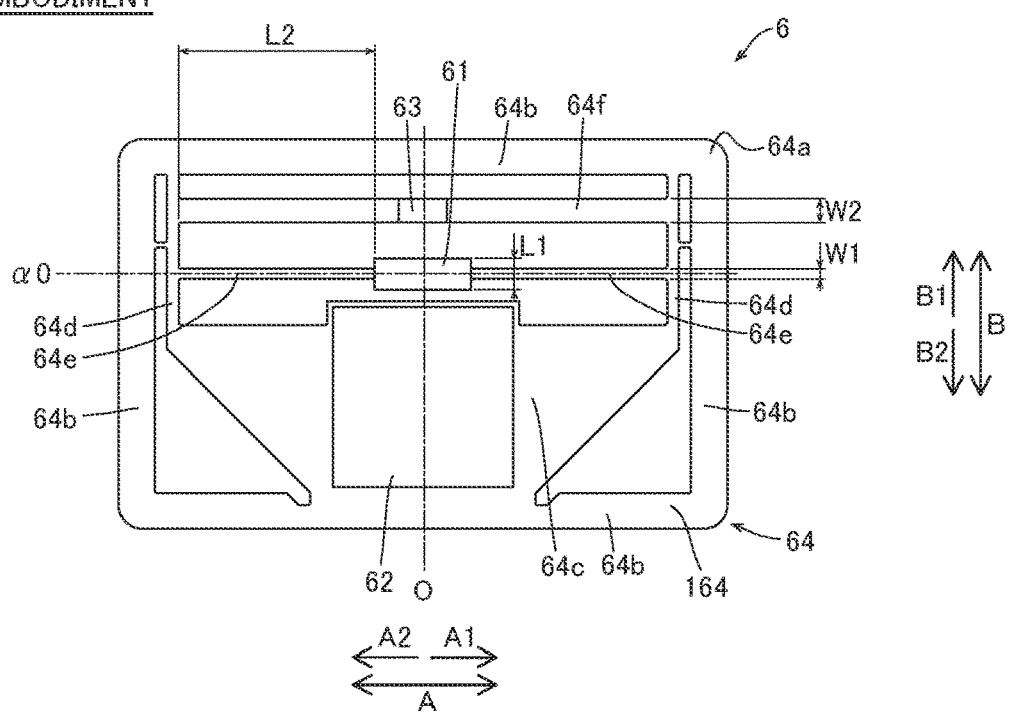
FIG. 2 is a plan view showing a horizontal scanning oscillating mirror element of the projector according to the first embodiment of the present invention.
Figure 3:
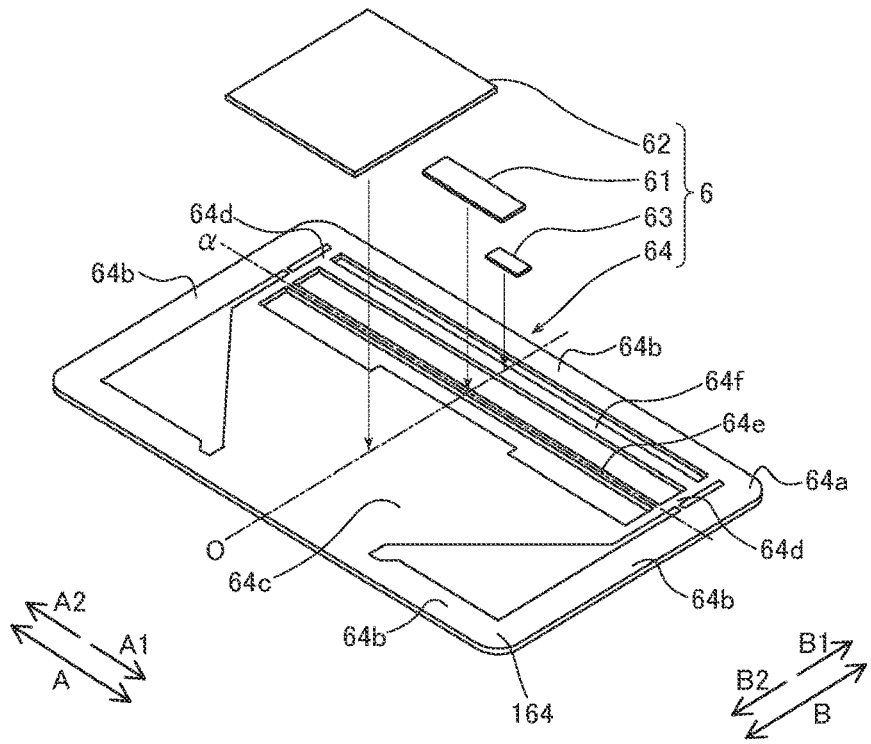
FIG. 3 is an exploded perspective view showing the horizontal scanning oscillating mirror element of the projector according to the first embodiment of the present invention.

The structure of a projector 100 according to a first embodiment of the present invention is now described with reference to FIGS. 1 to 3.

Figure 1:
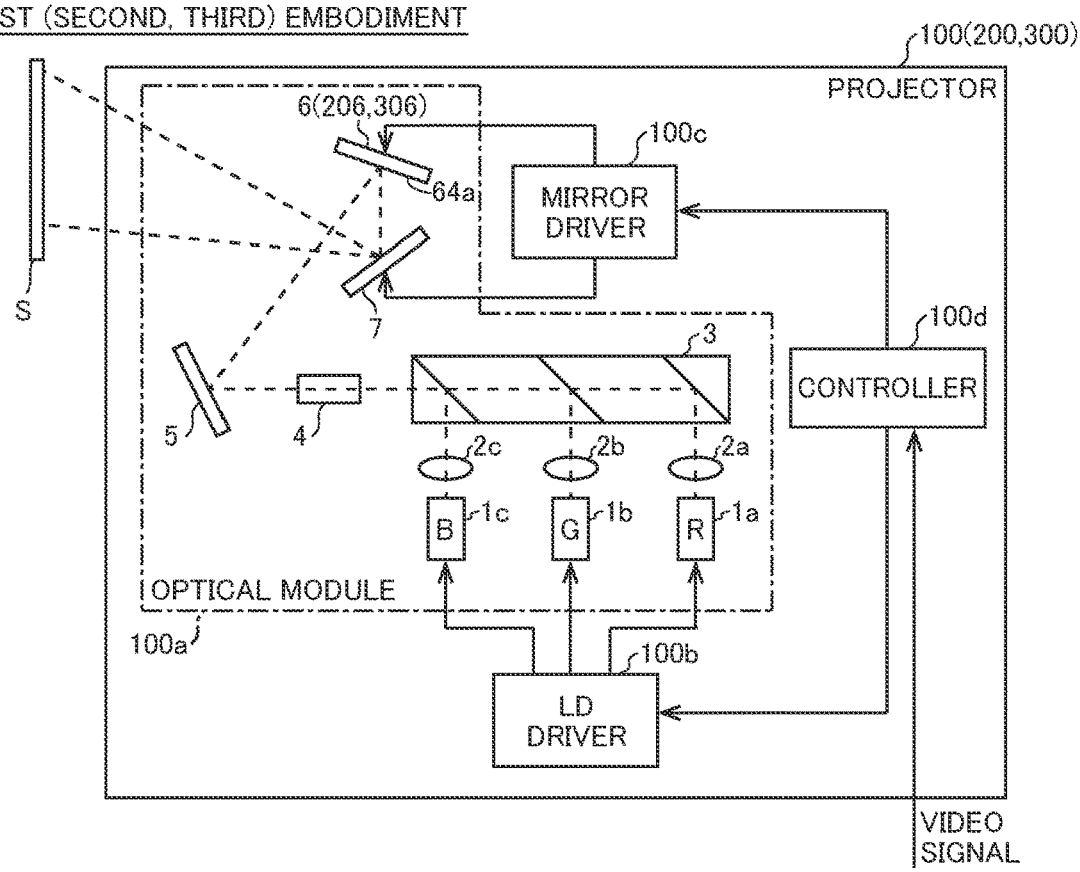
FIG. 1 is a block diagram showing the overall structure of a projector according to first to third embodiments of the present invention.

The projector 100 according to the first embodiment of the present invention includes an optical module 100a, a laser diode driver 100b, a mirror driver 100c, and a controller 100d, as shown in FIG. 1. The projector 100 is configured to form an image on a screen S by irradiating laser light (projection light) from the optical module 100a to the screen S.

(Structure of Optical Module)

The optical module 100a includes three laser diodes 1a to 1c, three collimator lenses 2a to 2c, an RGB synthesis prism 3, a condensing lens 4, a mirror 5, a vertical scanning oscillating mirror element 6, and a horizontal scanning oscillating mirror element 7. Laser light of respective colors emitted from the laser diodes 1a to 1c passes through the collimator lenses 2a to 2c, respectively, and thereafter reaches the RGB synthesis prism 3, the condensing lens 4, the mirror 5, the vertical scanning oscillating mirror element 6, and the horizontal scanning oscillating mirror element 7 in this order and is projected onto the screen S. The laser diodes 1a to 1c are examples of a "light source portion" in the claims. The vertical scanning oscillating mirror element 6 and the horizontal scanning oscillating mirror element 7 are examples of an "oscillating mirror element" in the claims.

The laser diodes 1a to 1c are configured to be capable of emitting red (R), green (G), and blue (B) laser light, respectively. The collimator lenses 2a to 2c are configured to convert the laser light of the respective colors emitted from the laser diodes 1a to 1c into parallel light, respectively.

The RGB synthesis prism 3 is configured to synthesize the laser light of the respective colors (three) into a single laser beam by aligning the optical axis of the laser light of the respective colors (three) converted into the parallel light by the collimator lenses 2a to 2c. The mirror 5 is configured to reflect the laser light condensed by the condensing lens 4 toward the vertical scanning oscillating mirror element 6.

The vertical scanning oscillating mirror element 6 is configured to scan the laser light from the mirror 5 in the vertical direction (upward-downward direction) of the image to be projected onto the screen S. The horizontal scanning oscillating mirror element 7 is configured to scan the laser light from the vertical scanning oscillating mirror element 6 in the horizontal direction (transverse direction) of the image to be projected onto the screen S. The vertical scanning oscillating mirror element 6 and the horizontal scanning oscillating mirror element 7 have structures similar to each other. The structure of the vertical scanning oscillating mirror element 6 is described later in detail.

The laser diode driver 100b is configured to drive the three laser diodes 1a to 1c under control of the controller 100d. The mirror driver 100c is configured to drive the vertical scanning oscillating mirror element 6 and the horizontal scanning oscillating mirror element 7 under control of the controller 100d. The controller 100d is configured to perform various types of control for projecting an image based on a video signal externally received.

(Structure of Vertical Scanning Oscillating Mirror Element)

The structure of the vertical scanning oscillating mirror element 6 is now described in detail with reference to FIGS. 2 and 3. The horizontal scanning oscillating mirror element 7 has a structure similar to the structure of the vertical scanning oscillating mirror element 6, and hence the description is omitted.

The vertical scanning oscillating mirror element 6 includes a mirror portion 61, a drive portion 62, a strain sensor 63, and a base 74.

The mirror portion 61 is configured to reflect the irradiated laser light in a predetermined direction. The mirror portion 61 is made of a material such as silicon. The mirror portion 61 is in the form of a rectangular flat plate. The mirror portion 61 is bonded to a mirror beam portion 64e, described later, of the base 64 with an epoxide-based adhesive, for example.

The drive portion 62 is in the form of a rectangular flat plate. The drive portion 62 is bonded to a drive plate portion 64c, described later, of the base 64 with an electrically conductive adhesive. The drive portion 62 includes a piezoelectric body (not shown) and two electrodes (not shown) between which the piezoelectric body is sandwiched. The drive portion 62 is configured to be capable of oscillating the mirror portion 61. Specifically, the two electrodes are wired (not shown), and the drive portion 62 is configured to be driven (expanded and contracted) by an alternating-current voltage applied between the two electrodes. Thus, the drive portion 62 is configured to oscillate the base 64 (excluding an outer frame portion 64b, described later, of the base 64) and oscillate the mirror portion 61 through the base 64.

The strain sensor 63 is bonded to a sensor beam portion 64f, described later, of the base 64 with an adhesive. The strain sensor 63 is configured to be capable of detecting the amount of displacement (swing angle) of the mirror portion 61. Specifically, as described above, the alternating-current voltage is applied to the drive portion 62 such that the drive portion 62 is driven (expanded and contracted), and hence the mirror beam portion 64e and the mirror portion 61 provided on the mirror beam portion 64e are displaced (swung). Similarly, the drive portion 62 is driven (expanded and contracted), and hence the sensor beam portion 64f and the strain sensor 63 provided on the sensor beam portion 64f are displaced (swung). The strain sensor 63 includes a piezoelectric body and has a function of generating a predetermined voltage according to the degree of deformation when the piezoelectric body is deformed. The amount of displacement of the mirror portion 61 is acquired based on a predetermined table in which the voltage generated when the piezoelectric body is deformed is associated with the amount of displacement of the mirror portion 61.

The base 64 is made of metal (stainless steel or spring steel, for example). The base 64 is in the form of a rectangular flat plate. The base 64 has a thickness of 50 to 300 μm, for example. In the following description, the longitudinal direction of the base 64 is set to a direction A (a direction A1 and a direction A2), and the short-side direction of the base 64 is set to a direction B (a direction B1 and a direction B2).

The laser light is irradiated from a surface 64a side to the base 64 (mirror portion 61). The base 64 is symmetric in the longitudinal direction (direction A). The mirror portion 61, the drive portion 62, and the strain sensor 63 are mounted on (bonded to) the surface 64a of the base 64. On the centerline O of the base 64 by which the base 64 is divided into two in the direction A, the strain sensor 63, the mirror portion 61, and the drive portion 62 are arranged in order from the B1 direction side.

The base 64 integrally includes a body portion 164 including the outer frame portion 64b, the drive plate portion 64c, a pair of beam support portions 64d, the mirror beam portion 64e, and the sensor beam portion 64f separate from the mirror beam portion 64e. The mirror beam portion 64e, the sensor beam portion 64f, and the body portion 164 are formed of a single member.

The outer frame portion 64b has a rectangular annular shape (i.e. frame shape) in a planar view. The outer frame portion 64b is fixed to a base member (not shown). Inside the outer frame portion 64b, the drive plate portion 64c, the pair of beam support portions 64d, and the mirror beam portion 64e, and the sensor beam portion 64f are arranged. The mirror beam portion 64e is connected to each of the pair of beam support portions 64d. The sensor beam portion 64f is connected to each of the pair of beam support portions 64d. The mirror beam portion 64e and the sensor beam portion 64f are arranged such that the central positions thereof substantially coincide with each other in a direction (direction A) in which the mirror beam portion 64e extends.

As described above, the drive portion 62 is bonded to the drive plate portion 64c. The drive plate portion 64c has a trapezoidal shape, the upper base of which is arranged at the B1 direction side and the lower base (a side shorter than the upper base) of which is arranged at the B2 direction side in the planar view. Ends of the drive plate portion 64c in the direction A at the B2 direction side (lower base side) are connected to the outer frame portion 64b. Ends of the drive plate portion 64c in the direction A at the B1 direction side (upper base side) are connected to the beam support portions 64d, respectively.

The pair of beam support portions 64d is in the form of a bar that extends in the direction B. The pair of beam support portions 64d is arranged near the sides of the outer frame portion 64b that extend in the direction B at the A1 direction side and the A2 direction side, respectively. First ends (ends in the direction B2) of the pair of beam support portions 64d extend toward the drive portion 62, and are connected to the drive plate portion 64c. Therefore, oscillation from the drive portion 62 is transmitted to the pair of beam support portions 64d through the drive plate portion 64c. In other words, the drive portion 62 is oscillated such that the drive plate portion 64c is deformed. Due to the deformation of the drive plate portion 64c, the pair of beam support portions 64d is also deformed. Second ends (ends K (see FIG. 4) in the direction B1) of the pair of beam support portions 64d are connected to the outer frame portion 64b. In other words, the ends K in the direction B1 of the pair of beam support portions 64d act as fixed ends. The pair of beam support portions 64d supports opposite ends of the mirror beam portion 64e and the sensor beam portion 64f, respectively.

The mirror beam portion 64e is in the form of a bar that extends in the direction A perpendicular to the beam support portions 64d. The mirror beam portion 64e is a both-end supported beam. The mirror portion 61 is bonded to the center of the mirror beam portion 64e in the direction A. In the planar view, the width W1 of the mirror beam portion 64e in the direction B is smaller than the length L1 of the short side of the mirror portion 61. The mirror beam portion 64e is arranged at the B1 direction side with respect to the drive plate portion 64c. The opposite ends of the mirror beam portion 64e are supported by the pair of beam support portions 64d, respectively. Oscillation from the drive portion 62 is transmitted to the mirror beam portion 64e through the pair of beam support portions 64d. Consequently, the mirror beam portion 64e (mirror portion 61) oscillates (swings) about an axis α0. The length of the mirror beam portion 64e to the mirror portion 61 (a length from a connection between the mirror beam portion 64e and each of the pair of beam support portions 64d to the mirror portion 61) is L2.

The sensor beam portion 64f is in the form of a bar. The sensor beam portion 64f is a both-end supported beam. The sensor beam portion 64f extends (extends in the direction A) substantially parallel to the mirror beam portion 64e. The strain sensor 63 is bonded to the center of the sensor beam portion 64f in the direction A. The sensor beam portion 64f is arranged at the B1 direction side with respect to the mirror beam portion 64e. In other words, the mirror beam portion 64e is arranged closer to the drive portion 62 with respect to the sensor beam portion 64f. In the planar view, the width W1 of the mirror beam portion 64e in the direction B is smaller than the width W2 of the sensor beam portion 64f in the direction B. In the planar view, the width W2 of the sensor beam portion 64f in the direction B is constant over the entire region in the direction A. Oscillation from the drive portion 62 is transmitted to the sensor beam portion 64f through the pair of beam support portions 64d.

Effects of First Embodiment

According to the first embodiment, the following effects can be obtained.

According to the first embodiment, as hereinabove described, the base 64 includes the mirror beam portion 64e provided with the mirror portion 61, the sensor beam portion 64f provided with the strain sensor 63, and the body portion 164 that supports the mirror beam portion 64e and the sensor beam portion 64f and is provided with the drive portion 62. Thus, the mirror portion 61, the strain sensor 63, and the drive portion 62 are provided at predetermined positions of the mirror beam portion 64e, the sensor beam portion 64f, and the body portion 164, respectively, whereby the strain sensor 63 can be spaced apart from the drive portion 62, and hence application of an excessive stress from the drive portion 62 to the strain sensor 63 can be significantly reduced or prevented. More specifically, the area of the drive plate portion 64c on which the drive portion 62 is arranged is large such that the deformation amount is increased, and when the strain sensor 63 is close to the drive portion 62, a stress applied to the strain sensor 63 is excessively increased. Therefore, the strain sensor 63 is spaced apart from the drive plate portion 64c and is arranged at a location where the deformation amount is smaller than that of the drive plate portion 64c, whereby application of an excessive stress from the drive portion 62 to the strain sensor 63 can be significantly reduced or prevented. Furthermore, the dedicated sensor beam portion 64f for providing the strain sensor 63 can be provided, and hence attenuation of the oscillation of the mirror portion 61 provided on the mirror beam portion 64e caused by the adhesive of the strain sensor 63 can be significantly reduced or prevented. Thus, a stable output can be obtained from the strain sensor 63 while a reduction in the scan characteristics of the mirror portion 61 is significantly reduced or prevented.

According to the first embodiment, as hereinabove described, the outer frame portion 64b on which the mirror beam portion 64e and the sensor beam portion 64f are inwardly arranged and the pair of beam support portions 64d that supports the mirror beam portion 64e and the sensor beam portion 64f and has the first ends extending toward the drive portion 62 and the second ends connected to the outer frame portion 64b are provided on the body portion 164 of the base 64. Thus, the mirror beam portion 64e provided with the mirror portion 61 and the sensor beam portion 64f provided with the strain sensor 63 are supported by the same member, which is the pair of beam support portions 64d, and hence a drive force can be efficiently transmitted from the drive portion 62 to the mirror beam portion 64e and the sensor beam portion 64f through the pair of beam support portions 64d.

According to the first embodiment, as hereinabove described, the mirror beam portion 64e is connected to each of the pair of beam support portions 64d, and the sensor beam portion 64f is connected to each of the pair of beam support portions 64d. Thus, both the mirror beam portion 64e and the sensor beam portion 64f are double-supported beams (both-end supported beams), and hence the mirror portion 61 and the strain sensor 63 can be stably supported by the mirror beam portion 64e and the sensor beam portion 64f in a state where the mirror portion 61 and the strain sensor 63 are independent of each other.

According to the first embodiment, as hereinabove described, the width of the mirror beam portion 64e is narrower than the width of the sensor beam portion 64f in a direction in which the mirror beam portion 64e and the sensor beam portion 64f are aligned. Thus, the stiffness of the mirror beam portion 64e becomes smaller than the stiffness of the sensor beam portion 64f, and hence the mirror portion 61 can swing more largely than the strain sensor 63.

According to the first embodiment, as hereinabove described, the mirror portion 61 and the strain sensor 63 are arranged such that the central positions thereof substantially coincide with each other in the direction in which the mirror beam portion 64e extends. Thus, the strain sensor 63 is arranged at a position that corresponds to the mirror portion 61 in the direction in which the mirror beam portion 64e extends, and hence the amount of displacement of the mirror portion 61 can be more accurately detected by the strain sensor 63.

According to the first embodiment, as hereinabove described, the mirror beam portion 64e is arranged substantially parallel to the sensor beam portion 64f. Thus, as compared with the case where the mirror beam portion 64e is arranged obliquely to the sensor beam portion 64f, a space in which the mirror beam portion 64e and the sensor beam portion 64f are arranged can be reduced. Therefore, the vertical scanning oscillating mirror element 6 (horizontal scanning oscillating mirror element 7) can be downsized.

According to the first embodiment, as hereinabove described, the mirror beam portion 64e is arranged closer to the drive portion 62 with respect to the sensor beam portion 64f. Thus, as compared with the case where the sensor beam portion 64f is arranged closer to the drive portion 62 with respect to the mirror beam portion 64e, the mirror portion 61 can be arranged closer to the drive portion 62 with respect to the strain sensor 63, and hence a drive force can be transmitted from the drive portion 62 to the mirror portion 61 with a low energy loss. Consequently, a large amount of displacement can be obtained in the mirror portion 61 with a little drive force, and hence the scan characteristics of the mirror portion 61 can be improved.

According to the first embodiment, as hereinabove described, the mirror beam portion 64e, the sensor beam portion 64f, and the body portion 164 that supports the mirror beam portion 64e and the sensor beam portion 64f and is provided with the drive portion 62 are formed of the single member. Thus, the apparatus structure can be simplified. Furthermore, the mirror beam portion 64e, the sensor beam portion 64f, and the body portion 164 are formed of the single member, and hence as compared with the case where the mirror beam portion 64e, the sensor beam portion 64f, and the body portion 164 are formed of separate members, oscillation from the drive portion 62 can be more effectively transmitted to the mirror beam portion 64e and the sensor beam portion 64f.

Second Embodiment

A projector 200 according to a second embodiment is now described with reference to FIGS. 1 and 4. In this second embodiment, in a planar view, the width of a sensor beam portion 264f in a direction B is not constant over the entire region in a direction A, unlike the first embodiment in which in the planar view, the width W2 of the sensor beam portion 64f in the direction B is constant over the entire region in the direction A. Portions of the projector 200 similar to those of the projector 100 according to the aforementioned first embodiment are denoted by the same reference numerals, to omit the description.

(Structure of Projector)

Figure 4:
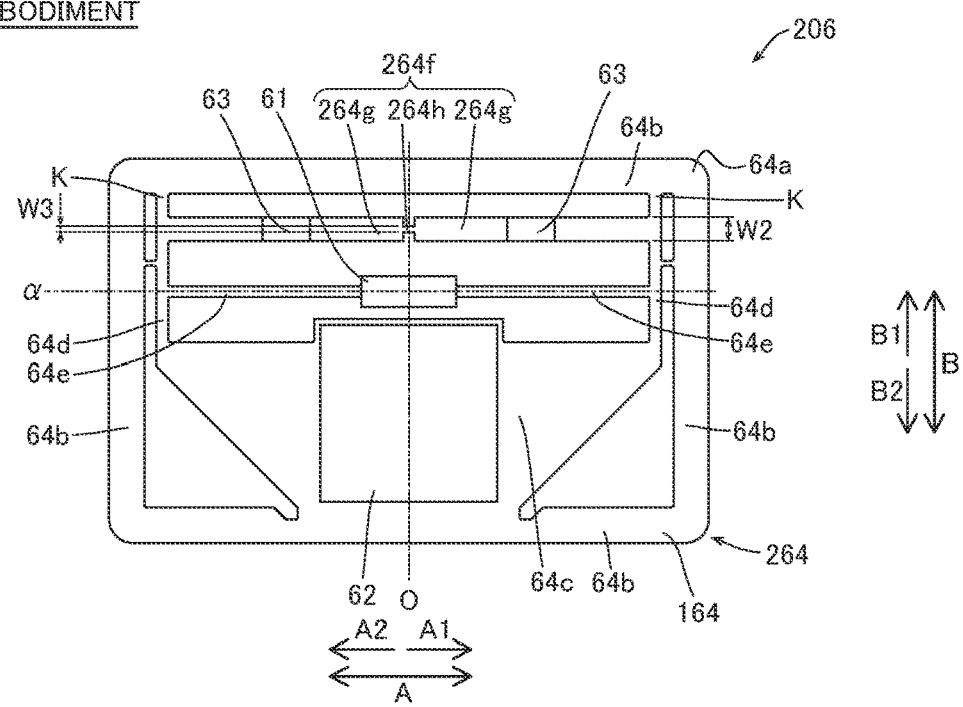
FIG. 4 is a plan view showing a horizontal scanning oscillating mirror element of the projector according to the second embodiment of the present invention.

In the projector 200 (see FIG. 1) according to the second embodiment, a base 264 of a vertical scanning oscillating mirror element 206 includes the sensor beam portion 264f including a pair of first portions 264g and a second portion 264h arranged between the pair of first portions 264g, as shown in FIG. 4. The second portion 264h connects ends of the pair of first portions 264g to each other, and has a width W3 different from the width of the pair of first portions 264g. The vertical scanning oscillating mirror element 206 is an example of an "oscillating mirror element" in the claims.

Specifically, first ends (outer ends) of the pair of first portions 264g are connected to a pair of beam support portions 64d, respectively. Second ends (inner ends) of the pair of first portions 264g are connected to the second portion 264h. Strain sensors 63 are provided at positions spaced apart from the second portion 264h by a predetermined distance on the pair of first portions 264g, respectively.

The second portion 264h is arranged on the centerline O of the base 264 (at the center of the sensor beam portion 264f in the direction A). In the planar view, the width W3 of the second portion 264h in the direction B is smaller than the width W2 of the pair of first portions 264g in the direction B. The width of the sensor beam portion 264f is designed such that detection signals detected by the strain sensors 63 fall within a predetermined range in consideration of the stiffness of the sensor beam portion 264f.

The remaining structures of the second embodiment are similar to those of the aforementioned first embodiment.

Effects of Second Embodiment

According to the second embodiment, the following effects can be obtained.

According to the second embodiment, similarly to the aforementioned first embodiment, the base 264 includes a mirror beam portion 64e provided with a mirror portion 61, the sensor beam portion 264f provided with the strain sensors 63, and a body portion 164 that supports the mirror beam portion 64e and the sensor beam portion 264f and is provided with a drive portion 62. Thus, stable outputs can be obtained from the strain sensors 63 while a reduction in the scan characteristics of the mirror portion 61 is significantly reduced or prevented.

According to the second embodiment, as hereinabove described, the pair of first portions 264g and the second portion 264h that connects the pair of first portions 264g to each other and has the width W3 smaller than the width of the pair of first portions 264g are provided in the sensor beam portion 264f. Thus, a portion (second portion 264h) having a small width can be partially provided in the sensor beam portion 264f due to the pair of first portions 264g and the second portion 264h. Consequently, the width W3 of the second portion 264h is set to an optimum value as a design value such that the stiffness of the sensor beam portion 264f can be controlled, and hence the amount of strain detected by the strain sensors 63 can be easily kept within an optimum range for the strain sensors 63. Specifically, when the outputs of the strain sensors 63 are small, the width W3 is reduced to reduce the stiffness such that the deformation of the sensor beam portion 264f is increased to increase the outputs. When the outputs of the strain sensors 63 are large, on the other hand, the width W3 is increased to increase the stiffness such that the outputs are reduced to a level at which the outputs are undistorted. Thus, the width W3 dimension is varied such that outputs from the strain sensors 63 can be kept within an optimum range.

Third Embodiment

A projector 300 according to a third embodiment is now described with reference to FIGS. 1 and 5. In this third embodiment, a pair of sensor beam portions 364f mounted with strain sensors 63 is a cantilever beam, unlike the first embodiment in which the sensor beam portion 64f mounted with the strain sensor 63 is the both-end supported beam. Portions of the projector 300 similar to those of the projector 100 according to the aforementioned first embodiment are denoted by the same reference numerals, to omit the description.

(Structure of Projector)

Figure 5:
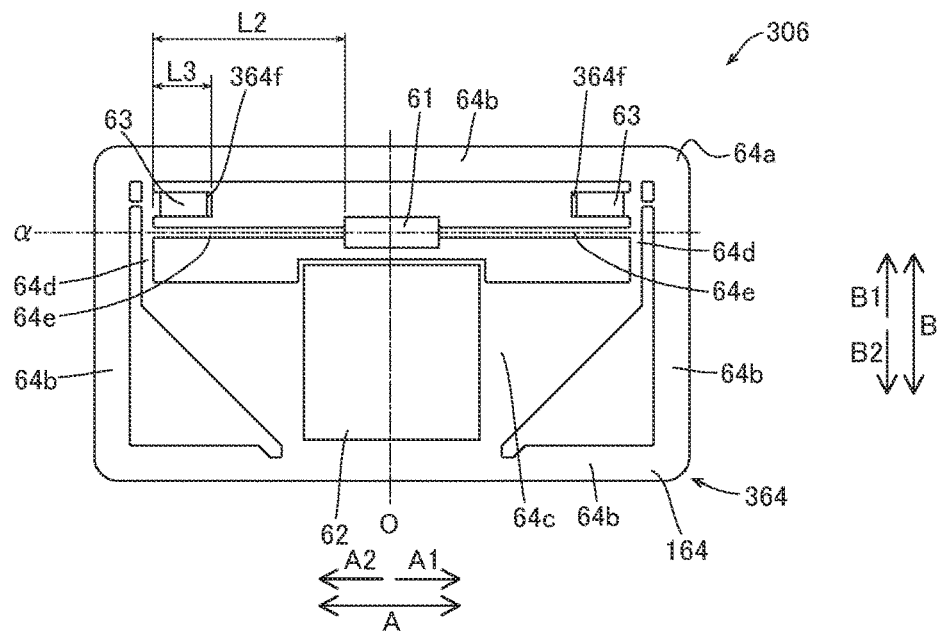
FIG. 5 is a plan view showing a horizontal scanning oscillating mirror element of the projector according to the third embodiment of the present invention.

In the projector 300 (see FIG. 1) according to the third embodiment, a base 364 of a vertical scanning oscillating mirror element 306 includes the pair of sensor beam portions 364f, as shown in FIG. 5. The strain sensors 63 are provided on the pair of sensor beam portions 364f, respectively. The vertical scanning oscillating mirror element 306 is an example of an "oscillating mirror element" in the claims.

First ends (outer ends) of the pair of sensor beam portions 364f are connected to beam support portions 64d, respectively. Second ends (inner ends) of the pair of sensor beam portions 364f are free ends. In other words, the pair of sensor beam portions 364f is the cantilever beam.

The length L3 of the pair of sensor beam portions 364f in a direction (direction B) in which the pair of sensor beam portions 364f extends is shorter than the length L2 (0.9 mm, for example) of a mirror beam portion 64e to a mirror portion 61.

Furthermore, the length L3 of the pair of sensor beam portions 364f is not more than one half of the length L2 of the mirror beam portion 64e to the mirror portion 61.

Preferably, the length of the pair of sensor beam portions 364f is not more than one third of the length L2 of the mirror beam portion 64e to the mirror portion 61. The length L3 of the pair of sensor beam portions 364f is preferably shorter within a range in which the strain sensors 63 can detect detection signals based on the oscillation of the mirror portion 61.

The remaining structures of the third embodiment are similar to those of the aforementioned first embodiment.

Effects of Third Embodiment

According to the third embodiment, the following effects can be obtained.

According to the third embodiment, similarly to the aforementioned first embodiment, the base 364 includes the mirror beam portion 64e provided with the mirror portion 61, the pair of sensor beam portions 364f provided with the strain sensors 63, and a body portion 164 that supports the mirror beam portion 64e and the pair of sensor beam portions 364f and is provided with a drive portion 62. Thus, stable outputs can be obtained from the strain sensors 63 while a reduction in the scan characteristics of the mirror portion 61 is significantly reduced or prevented.

According to the third embodiment, as hereinabove described, the pair of sensor beam portions 364f includes the cantilever beam arranged substantially parallel to the mirror beam portion 64e, and the length of the cantilever beam in a direction in which the cantilever beam extends is shorter than the length of the mirror beam portion 64e to the mirror portion 61. Thus, as compared with the case where the length in the direction in which the cantilever beam extends is longer than the length of the mirror beam portion 64e to the mirror portion 61, the natural frequency of the mirror beam portion 64e and the natural frequency of the cantilever beam can be moved away from each other, and hence unnecessary resonance between the mirror beam portion 64e and the cantilever beam can be significantly reduced or prevented. In other words, the cantilever beam is used (the length of the beam is reduced), whereby the frequency is increased, and a difference in natural frequency between the cantilever beam and the mirror beam portion 64e is relatively increased. Thus, unnecessary resonance between the mirror beam portion 64e and the cantilever beam can be significantly reduced or prevented. Consequently, unstable outputs from the strain sensors 63 can be significantly reduced or prevented.

According to the third embodiment, as hereinabove described, the length of the pair of sensor beam portions 364f, which is the cantilever beam, is not more than one half of the length of the mirror beam portion 64e to the mirror portion 61. Thus, the cantilever beam is further reduced in length, whereby unnecessary resonance between the mirror beam portion 64e and the cantilever beam can be further significantly reduced or prevented. Consequently, unstable outputs from the strain sensors 63 can be further significantly reduced or prevented.

Fourth Embodiment

A projector 400 according to a fourth embodiment is now described with reference to FIG. 6. In this fourth embodiment, the projector 400 further includes an analyzer 400e that analyzes a frequency component(s) detected by a strain sensor 63 in addition to the structures of the projector 100 according to the first embodiment. Portions of the projector 400 similar to those of the projector 100 according to the aforementioned first embodiment are denoted by the same reference numerals, to omit the description.

(Structure of Projector)

Figure 6:
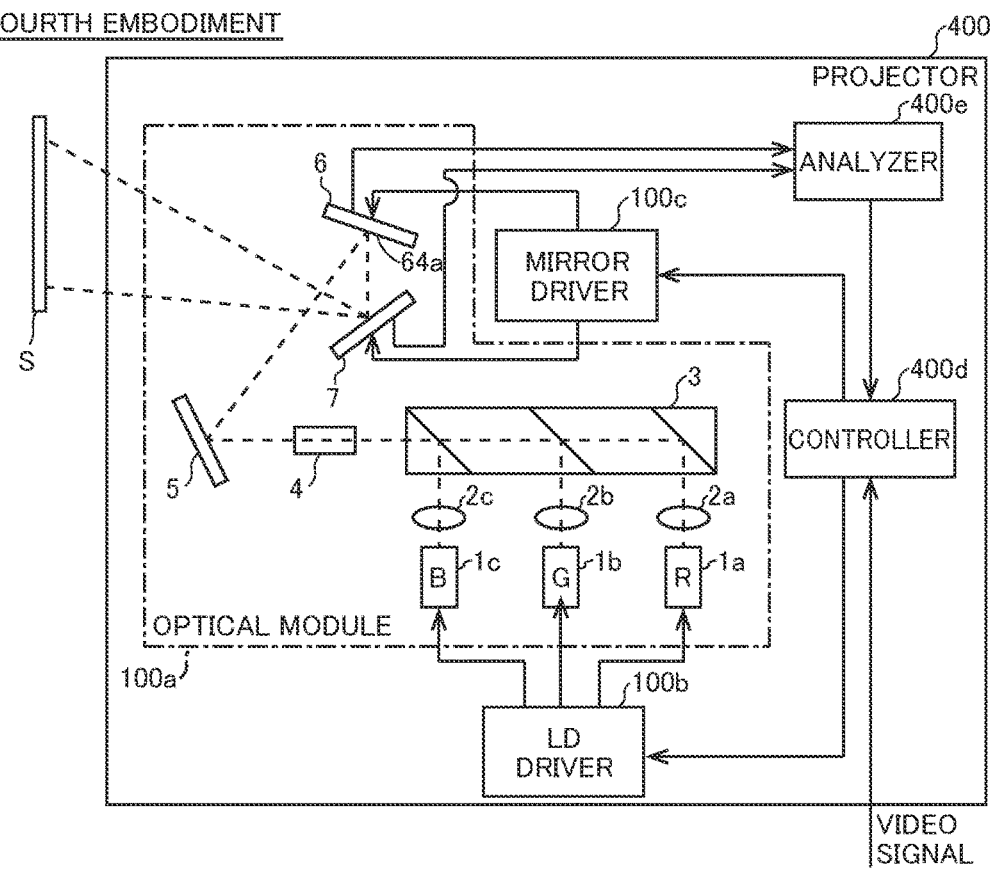
FIG. 6 is a block diagram showing the overall structure of a projector according to a fourth embodiment of the present invention.

The projector 400 according to the fourth embodiment includes the analyzer 400e that analyzes the frequency component(s) detected by the strain sensor 63, as shown in FIG. 6. The projector 400 is configured to stop emission of projection light from laser diodes 1a to 1c when a frequency component other than a predetermined frequency component is detected in the analyzer 400e.

Specifically, the analyzer 400e includes a low-pass filter and a high-pass filter, which are not shown. The analyzer 400e is configured to transmit a stop signal to a controller 400d when determining that these low-pass filter and high-pass filter have detected a frequency component different from a frequency component based on the normal oscillation (oscillation at the time of image projection) of a mirror portion 61 from among the frequency component(s) of a detection signal detected by the strain sensor 63. The controller 400d is configured to perform control of stopping emission of laser light from the laser diodes 1a to 1c when receiving the stop signal.

The remaining structures of the fourth embodiment are similar to those of the aforementioned first embodiment.

Effects of Fourth Embodiment

According to the fourth embodiment, the following effects can be obtained.

According to the fourth embodiment, similarly to the aforementioned first embodiment, a base 64 includes a mirror beam portion 64e provided with the mirror portion 61, a sensor beam portion 64f provided with the strain sensor 63, and a body portion 164 that supports the mirror beam portion 64e and the sensor beam portion 64f and is provided with a drive portion 62. Thus, stable outputs can be obtained from the strain sensor 63 while a reduction in the scan characteristics of the mirror portion 61 is significantly reduced or prevented.

According to the fourth embodiment, as hereinabove described, the projector 400 includes the analyzer 400e that analyzes the frequency component(s) of the detection signal detected by the strain sensor 63, and stops the emission of projection light from the laser diodes 1a to 1c when the frequency component other than the predetermined frequency component is detected in the analyzer 400e. Thus, the analyzer 400e can promptly know the failure of the mirror portion 61 or the like that causes the frequency component other than the predetermined frequency component to be detected, and hence the emission of the projection light from the laser diodes 1a to 1c can be promptly stopped.

Fifth Embodiment (Structure of Projector)

The structure of a projector 500 according to a fifth embodiment of the present invention is now described with reference to FIG. 7.

Figure 7:
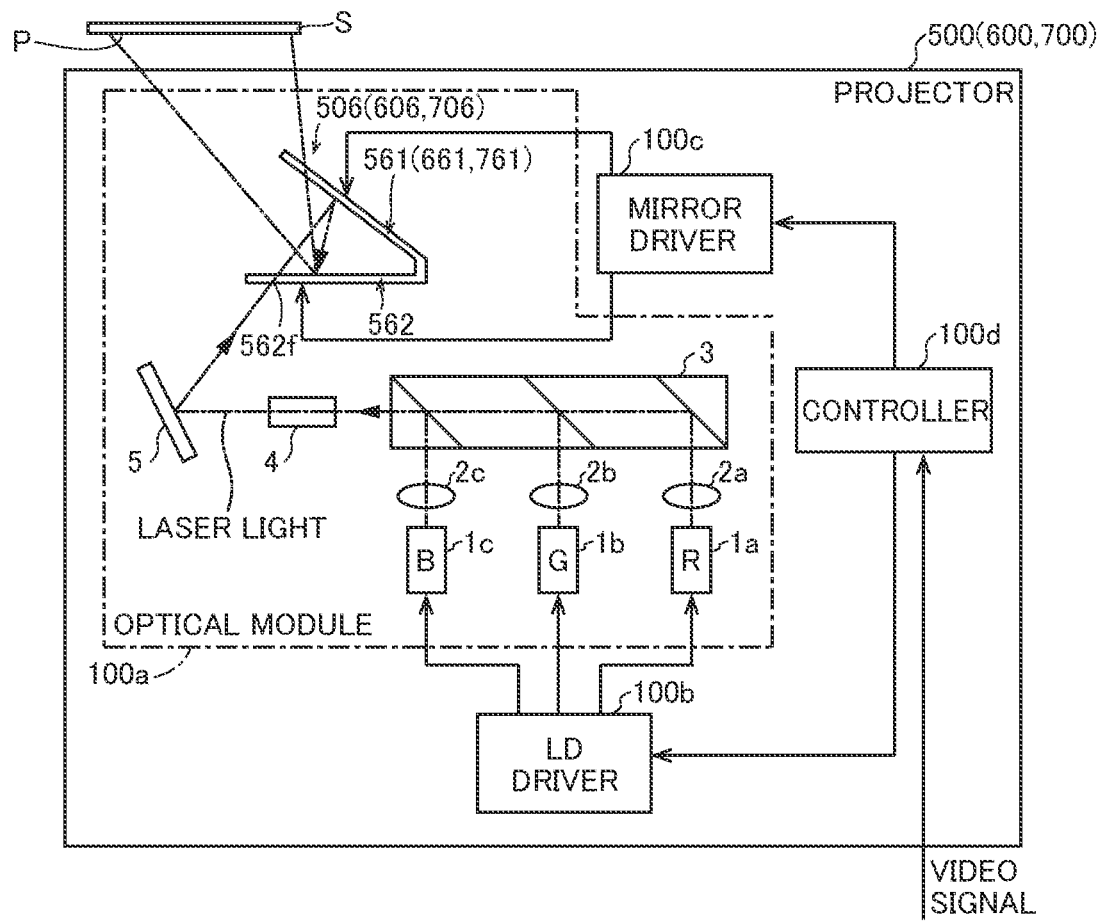
FIG. 7 is a block diagram showing the overall structure of a projector according to fifth to seventh embodiments of the present invention.

The projector 500 according to the fifth embodiment of the present invention includes an optical module 100a, a laser diode drive 100b, a mirror driver 100c, and a controller 100d, as shown in FIG. 7. The projector 500 is configured to project a projection image P on a screen S by irradiating laser light (projection light) from the optical module 100a to the screen S.

(Structure of Optical Module)

The optical module 100a includes three laser diodes 1a to 1c, three collimator lenses 2a to 2c, an RGB synthesis prism 3, a condensing lens 4, a mirror 5, a vertical scanning oscillating mirror element 6, and an oscillating mirror element 506. Laser light of respective colors emitted from the laser diodes 1a to 1c passes through the collimator lenses 2a to 2c, respectively, and thereafter reaches the RGB synthesis prism 3, the condensing lens 4, and the mirror 5 in this order. Then, the laser light reflected by the mirror 5 passes through an opening 562f (see FIG. 8), described later, of the oscillating mirror element 506, and thereafter is reflected by a vertical scanning oscillating mirror element portion 561, described later, of the oscillating mirror element 506, is further reflected by a horizontal scanning oscillating mirror element portion 562, described later, of the oscillating mirror element 506, and forms the projection image P on the screen S. The vertical scanning oscillating mirror element portion 561 is an example of a "first oscillating mirror element portion" in the claims. The horizontal scanning oscillating mirror element portion 562 is an example of a "second oscillating mirror element portion" in the claims.

The laser diodes 1a to 1c are configured to be capable of emitting red (R), green (G), and blue (B) laser light, respectively. The collimator lenses 2a to 2c are configured to convert the laser light of the respective colors emitted from the laser diodes 1a to 1c into parallel light, respectively.

The RGB synthesis prism 3 is configured to synthesize the laser light of the respective (three) colors into a single laser beam by aligning the optical axis of the laser light of the respective (three) colors converted into the parallel light by the collimator lenses 2a to 2c. The mirror 5 is configured to reflect the laser light condensed by the condensing lens 4 toward the oscillating mirror element 506.

(Structure of Oscillating Mirror Element)

The structure of the oscillating mirror element 506 is now described with reference to FIG. 8.

As shown in FIG. 8, the oscillating mirror element 506 includes a base 560, the vertical scanning oscillating mirror element portion 561, and the horizontal scanning oscillating mirror element portion 562. The vertical scanning oscillating mirror element portion 561 includes a vertical scanning mirror portion 561a that receives and reflects the light from the laser diodes 1a to 1c and is driven to be swingable about an axis α. The horizontal scanning oscillating mirror element portion 562 includes a horizontal scanning mirror portion 562a that receives and reflects the light from the vertical scanning mirror portion 561a and is driven to be swingable about an axis β extending in a direction substantially perpendicular to the axis α. The vertical scanning mirror portion 561a is an example of a "first mirror portion" in the claims, and the horizontal scanning mirror portion 562a is an example of a "second mirror portion" in the claims. The axis α is an example of a "first axis" in the claims, and the axis β is an example of a "second axis" in the claims.

(Structure of Vertical Scanning Oscillating Mirror Element Portion)

The structure of the vertical scanning oscillating mirror element portion 561 is now described in detail with reference to FIGS. 8 to 10.

As shown in FIG. 8, the vertical scanning oscillating mirror element portion 561 includes the vertical scanning mirror portion 561a, a first drive portion 561b, and a base 561c on which the vertical scanning mirror portion 561a and the first drive portion 561b are provided. The base 561c has a surface 611c. The surface 611c is an example of a "first surface" in the claims.

The vertical scanning mirror portion 561a is in the form of a rectangular flat plate.

According to the fifth embodiment, the first drive portion 561b is arranged between a fold line 563 described later and the vertical scanning mirror portion 561a, and resonantly drives a pair of first mirror beam portions 561d described later. Specifically, the first drive portion 561b is in the form of a rectangular flat plate. The first drive portion 561b includes a piezoelectric body (not shown) and two electrodes (not shown) between which the piezoelectric body is sandwiched. The first drive portion 561b is configured to be capable of swingably drives the vertical scanning mirror portion 561a. Specifically, the two electrodes are wired (not shown), and the first drive portion 561b is configured to be driven (expanded and contracted) by a voltage applied between the two electrodes.

The base 561c is made of metal (stainless steel, for example). In the following description, the longitudinal direction of the base 561c is set to a direction C (a direction C1 and a direction C2), and the short-side direction of the base 561c is set to a direction D (a direction D1 and a direction D2), as shown in FIGS. 8 and 9.

As shown in FIG. 8, the base 561c is symmetric about the centerline O1 of the base 561c. The vertical scanning mirror portion 561a and the first drive portion 561b are mounted on (bonded to) the surface 611c of the base 561c. As shown in FIG. 8, the vertical scanning mirror portion 561a and the first drive portion 561b are arranged on the centerline O1 of the base 561c in order from the D1 direction side. As shown in FIGS. 9 and 10, laser light is irradiated from the surface 611c side to the base 561c (vertical scanning mirror portion 561a).

As shown in FIG. 8, the base 561c integrally includes the pair of first mirror beam portions 561d and a pair of beam support portions 561e. The base 561c includes a pair of first sensor beam portions 70. The pair of first sensor beam portions 70 is provided with first strain sensors 71, respectively. The pair of first sensor beam portions 70 is a cantilever beam. The pair of first sensor beam portions 70 is arranged substantially parallel to the pair of first mirror beam portions 561d. The pair of first sensor beam portions 70 is connected to the pair of beam support portions 561e, respectively. The pair of first sensor beam portions 70 extends inward of the vertical scanning oscillating mirror element portion 561 from the pair of beam support portions 561e. The pair of first sensor beam portions 70 is arranged closer to the first drive portion 561b (at the D2 direction side) with respect to the pair of first mirror beam portions 561d.

As shown in FIG. 8, the pair of beam support portions 561e is in the form of a bar that extends in the direction D. Oscillation from the first drive portion 561b is transmitted to the pair of beam support portions 561e. The pair of beam support portions 561e supports ends of the pair of first mirror beam portions 561d, respectively.

As shown in FIG. 8, the pair of first mirror beam portions 561d is in the form of a bar that extends in the direction C perpendicular to the pair of beam support portions 561e. The vertical scanning mirror portion 561a is provided between the pair of first mirror beam portions 561d. Specifically, the vertical scanning mirror portion 561a includes a vertical scanning mirror body portion 611a made of silicon and a vertical scanning mirror support portion 611b integrally formed on the base 561c (pair of first mirror beam portions 561*d*), to which the vertical scanning mirror body portion 611*a* is bonded. The pair of first mirror beam portions 561*d* is configured to support the vertical scanning mirror portion 561*a* such that the vertical scanning mirror portion 561*a* is driven to be swingable. Oscillation from the first drive portion 561*b* is transmitted to the pair of first mirror beam portions 561*d* through the pair of beam support portions 561*e*. The pair of first mirror beam portions 561*d* (vertical scanning mirror portion 561*a*) is configured to be driven to swing about the axis α.

(Structure of Horizontal Scanning Oscillating Mirror Element Portion)

The structure of the horizontal scanning oscillating mirror element portion 562 is now described in detail with reference to FIGS. 8 to 10.

As shown in FIG. 8, the horizontal scanning oscillating mirror element portion 562 includes the horizontal scanning mirror portion 562*a*, a second drive portion 562*b*, and a base 562*c* on which the horizontal scanning mirror portion 562*a* and the second drive portion 562*b* are provided. The base 562*c* has a surface 621*c*. The surface 621*c* is an example of a "second surface" in the claims.

The horizontal scanning mirror portion 562*a* is in the form of a rectangular flat plate.

The second drive portion 562*b* is in the form of a substantially square flat plate. The second drive portion 562*b* includes a piezoelectric body (not shown) and two electrodes (not shown) between which the piezoelectric body is sandwiched. The second drive portion 562*b* is configured to be capable of swingably drives the horizontal scanning mirror portion 562*a*. Specifically, the two electrodes are wired (not shown), and the second drive portion 562*b* is configured to be driven (expanded and contracted) by a voltage applied between the two electrodes. Thus, the second drive portion 562*b* is configured to resonantly drive a pair of second mirror beam portions 562*d* and to swingably drive the horizontal scanning mirror portion 562*a*.

The base 562*c* is made of metal (stainless steel, for example). The base 562*c* is in the form of a substantially rectangular flat plate. In the following description, the longitudinal direction of the base 562*c* is set to a direction E (a direction E1 and a direction E2), and the short-side direction of the base 562*c* is set to a direction F (a direction F1 and a direction F2), as shown in FIGS. 8 and 9. The base 562*c* includes a pair of second sensor beam portions 72. The pair of second sensor beam portions 72 is provided with second strain sensors 73, respectively. The pair of second sensor beam portions 72 is a cantilever beam. The pair of second sensor beam portions 72 is arranged substantially parallel to the pair of second mirror beam portions 562*d*. The pair of second sensor beam portions 72 is connected to a pair of beam support portions 562*e*, respectively. The pair of second sensor beam portions 72 extends inward of the horizontal scanning oscillating mirror element portion 562 from the pair of beam support portions 562*e*. The pair of second sensor beam portions 72 is arranged closer to the second drive portion 562*b* (at the F2 direction side) with respect to the pair of second mirror beam portions 562*d*.

As shown in FIG. 8, the base 562*c* is symmetric about the centerline O2 of the base 562*c*. The horizontal scanning mirror portion 562*a* and the second drive portion 562*b* are mounted on (bonded to) the surface 621*c* of the base 562*c*. The horizontal scanning mirror portion 562*a* and the second drive portion 562*b* are arranged on the centerline O2 of the base 562*c* in order from the F1 direction side. As shown in FIGS. 9 and 10, the laser light reflected by the vertical scanning mirror portion 561*a* is irradiated to the base 562*c* (horizontal scanning mirror portion 562*a*).

As shown in FIG. 8, the base 562*c* integrally includes the pair of second mirror beam portions 562*d* and the pair of beam support portions 562*e*.

As shown in FIG. 8, the pair of beam support portions 562*e* is in the form of a bar that extends in the direction F. Oscillation from the second drive portion 562*b* is transmitted to the pair of beam support portions 562*e*. The pair of beam support portions 562*e* supports ends of the pair of second mirror beam portions 562*d*, respectively.

As shown in FIG. 8, the pair of second mirror beam portions 562*d* is in the form of a bar that extends in the direction E perpendicular to the pair of beam support portions 562*e*. The horizontal scanning mirror portion 562*a* is provided between the pair of second mirror beam portions 562*d*. Specifically, the horizontal scanning mirror portion 562*a* includes a horizontal scanning mirror body portion 621*a* made of silicon and a horizontal scanning mirror support portion 621*b* integrally formed on the base 562*c* (pair of second mirror beam portions 562*d*), to which the horizontal scanning mirror body portion 621*a* is bonded, as shown in FIG. 9. The pair of second mirror beam portions 562*d* is configured to support the horizontal scanning mirror portion 562*a* such that the horizontal scanning mirror portion 562*a* is driven to be swingable. Oscillation from the second drive portion 562*b* is transmitted to the pair of second mirror beam portions 562*d* through the pair of beam support portions 562*e*. The pair of second mirror beam portions 562*d* (horizontal scanning mirror portion 562*a*) is configured to be driven to swing about the axis β.

The base 561*c* and the base 562*c* (base 560) are integrally formed. According to the fifth embodiment, the base 560 is provided with the fold line 563 along a direction substantially parallel to the axis α, as shown in FIG. 8. As shown in FIG. 9, the base 560 is configured such that a fold angle between the surface 611*c* and the surface 621*c* is an acute angle. For example, the base 560 is configured such that the fold angle between the surface 611*c* and the surface 621*c* is 20 degrees. Thus, the vertical scanning oscillating mirror element portion 561 (vertical scanning mirror portion 561*a*) and the horizontal scanning oscillating mirror element portion 562 (horizontal scanning mirror portion 562*a*) face each other.

According to the fifth embodiment, the base 560 includes a pair of openings 562*f* provided near the horizontal scanning mirror portion 562*a*, as shown in FIG. 9. Specifically, the pair of openings 562*f* is provided adjacent to the horizontal scanning mirror portion 562*a* and the pair of second mirror beam portions 562*d*, as shown in FIG. 8. More specifically, the pair of openings 562*f* is provided at the F1 direction side and the F2 direction side with respect to the horizontal scanning mirror portion 562*a* and the pair of second mirror beam portions 562*d*. The pair of openings 562*f* has a substantially rectangular shape that extends in the direction E in a planar view. The opening 562*f* at the F1 direction side is adjacent to (surrounded by) the horizontal scanning mirror portion 562*a*, the pair of second mirror beam portions 562*d*, and the pair of beam support portions 562*e*. The opening 562*f* at the F2 direction side is adjacent to (surrounded by) the horizontal scanning mirror portion 562*a*, the pair of second mirror beam portions 562*d*, the pair of beam support portions 562*e*, and the second drive portion 562*b*.

Figure 10:
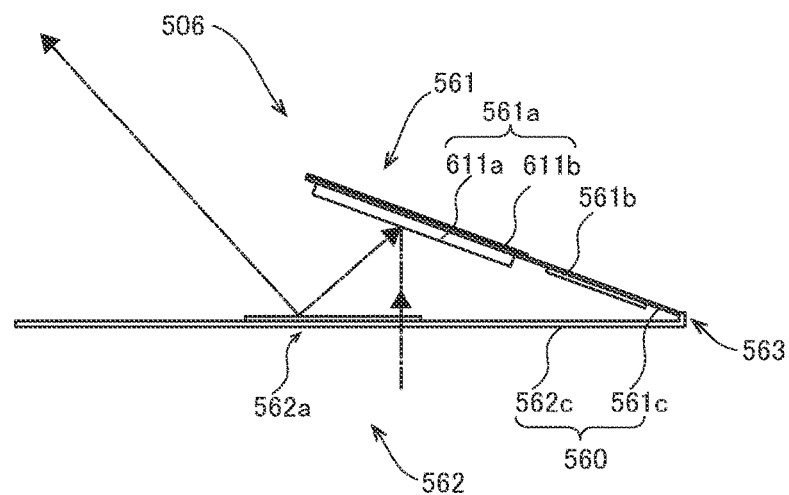
FIG. 10 is a side elevational view showing the oscillating mirror element of the projector according to the fifth embodiment of the present invention.

As shown in FIGS. 9 and 10, the light from the laser diodes 1*a* to 1*c* passes through the opening 562*f* from a surface side opposite to the surface 621*c* on which the horizontal scanning mirror portion 562a of the horizontal scanning oscillating mirror element portion 562 is provided, whereby the light irradiated to the vertical scanning oscillating mirror element portion 561 and reflected by the vertical scanning mirror portion 561a is directly irradiated to the horizontal scanning mirror portion 562a. Thus, the projector 500 is configured to irradiate the light from the vertical scanning mirror portion 561a, which corresponds to the projection image P, to the horizontal scanning mirror portion 562a and to display the projection image P by irradiating the light from the horizontal scanning mirror portion 562a, which corresponds to the projection image P, onto the screen S.

Effects of Fifth Embodiment

According to the fifth embodiment, the following effects can be obtained.

According to the fifth embodiment, as hereinabove described, the projector 500 includes the vertical scanning mirror portion 561a that receives and reflects the light from the laser diodes 1a to 1c and is driven to be swingable about the axis α and the horizontal scanning mirror portion 562a that receives and reflects the light from the vertical scanning mirror portion 561a and is driven to be swingable about the axis β that extends in the direction substantially perpendicular to the axis α, the projector 500 further includes the vertical scanning oscillating mirror element portion 561 including the vertical scanning mirror portion 561a and the horizontal scanning oscillating mirror element portion 562 including the horizontal scanning mirror portion 562a, the base 560 has the surface 611c provided with the vertical scanning oscillating mirror element portion 561 and the surface 621c provided with the horizontal scanning oscillating mirror element portion 562, and the pair of first mirror beam portions 561d, the pair of first sensor beam portions 70, and the vertical scanning mirror body portion 611a are provided in the vertical scanning oscillating mirror element portion 561 while the pair of second mirror beam portions 562d, the pair of second sensor beam portions 72, and the horizontal scanning mirror body portion 621a are provided in the horizontal scanning oscillating mirror element portion 562. Thus, the oscillating mirror element 506 can be configured such that the light from the laser diodes 1a to 1c can be scanned in a plurality of directions by the vertical scanning oscillating mirror element portion 561 and the horizontal scanning oscillating mirror element portion 562.

According to the fifth embodiment, as hereinabove described, the fold angle between the surface 611c and the surface 621c of the base 560 is the acute angle. Thus, the light reflected by the vertical scanning mirror portion 561a can be directly irradiated to the horizontal scanning mirror portion 562a without using a reflective plate to reflect the light reflected by the vertical scanning mirror portion 561a. Consequently, no reflective plate is used, whereby the structure can be simplified while optical deviation is significantly reduced or prevented. Furthermore, it is simply required to fold the single base 560 made of metal, and hence the manufacturing process can be simplified.

According to the fifth embodiment, as hereinabove described, the base 560 is provided with the fold line 563 to fold the base 560 along the direction substantially parallel to the axis α. Thus, when the base 560 is folded along the fold line 563, the light reflected by the swinging horizontal scanning mirror portion 562a swings (is scanned) in a direction along the fold line 563 in the planar view, and hence the light reflected by the horizontal scanning mirror portion 562a does not swing in a direction toward the vertical scanning mirror portion 561a. Consequently, blocking (reflection) of light by the vertical scanning mirror portion 561a can be significantly reduced or prevented.

According to the fifth embodiment, as hereinabove described, the projector 500 includes the first drive portion 561b placed on the vertical scanning oscillating mirror element portion 561 and arranged between the fold line 563 and the vertical scanning mirror portion 561a and the second drive portion 562b placed on the horizontal scanning oscillating mirror element portion 562, and the first drive portion 561b resonantly drives the pair of first mirror beam portions 561d. Thus, a dead space between the fold line 563 and the vertical scanning mirror portion 561a can be effectively utilized, and hence the oscillating mirror element 506 cab be downsized.

According to the fifth embodiment, as hereinabove described, the base 560 includes the opening 562f provided near the horizontal scanning mirror portion 562a. Furthermore, the light from the laser diodes 1a to 1c passes through the opening 562f from the surface side of the horizontal scanning oscillating mirror element portion 562 opposite to the surface 621c to be irradiated to the vertical scanning oscillating mirror element portion 561, and the light reflected by the vertical scanning mirror portion 561a is directly irradiated to the horizontal scanning mirror portion 562a. Thus, the light from the laser diodes 1a to 1c can be irradiated to the vertical scanning mirror portion 561a through the opening 562f without using a reflective plate, and the light reflected by the vertical scanning mirror portion 561a can be irradiated to the horizontal scanning mirror portion 562a without using the reflective plate. Consequently, no reflective plate is used, whereby the structure can be simplified while optical deviation is significantly reduced or prevented.

Sixth Embodiment

The structure of a projector 600 according to a sixth embodiment is now described with reference to FIGS. 11 to 13. According to the sixth embodiment, a pair of first mirror beam portions 661d of an oscillating mirror element 606 has a thickness t2. Portions of the projector 600 similar to those of the projector 500 according to the aforementioned fifth embodiment are denoted by the same reference numerals, to omit the description.

Figure 11:
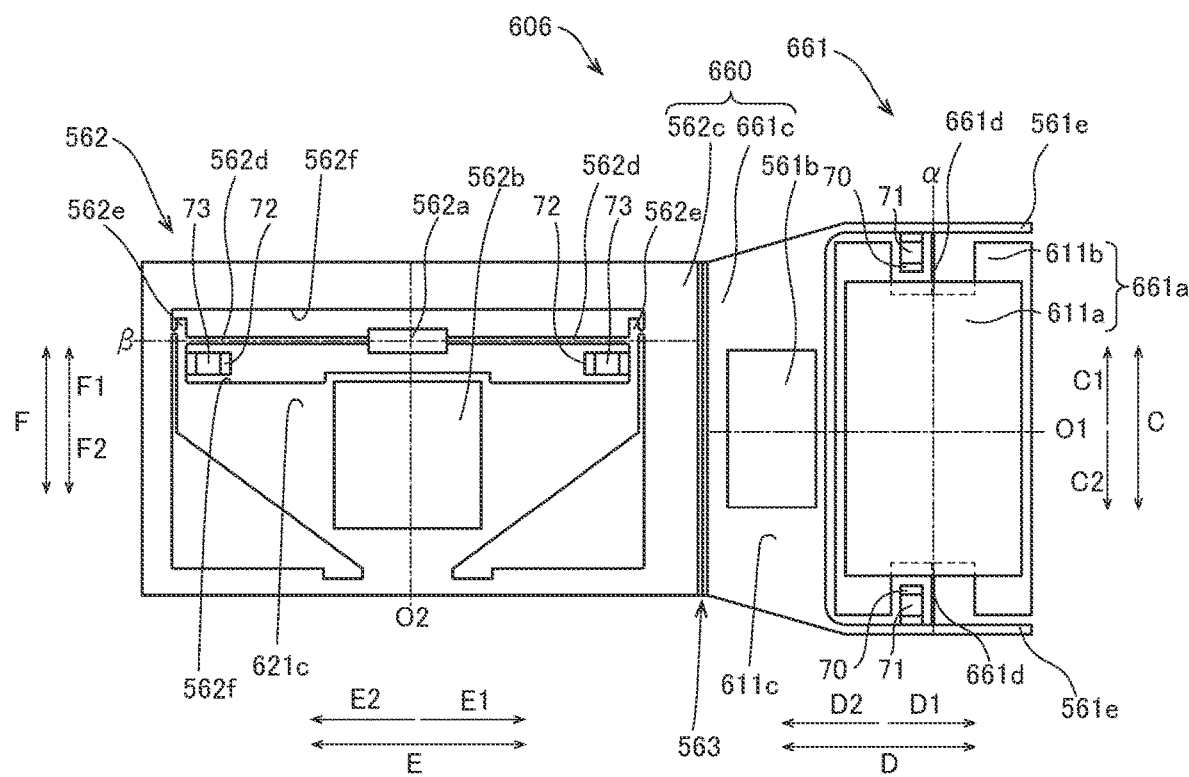
FIG. 11 is a plan view showing an oscillating mirror element of the projector according to the sixth embodiment of the present invention.
Figure 12:
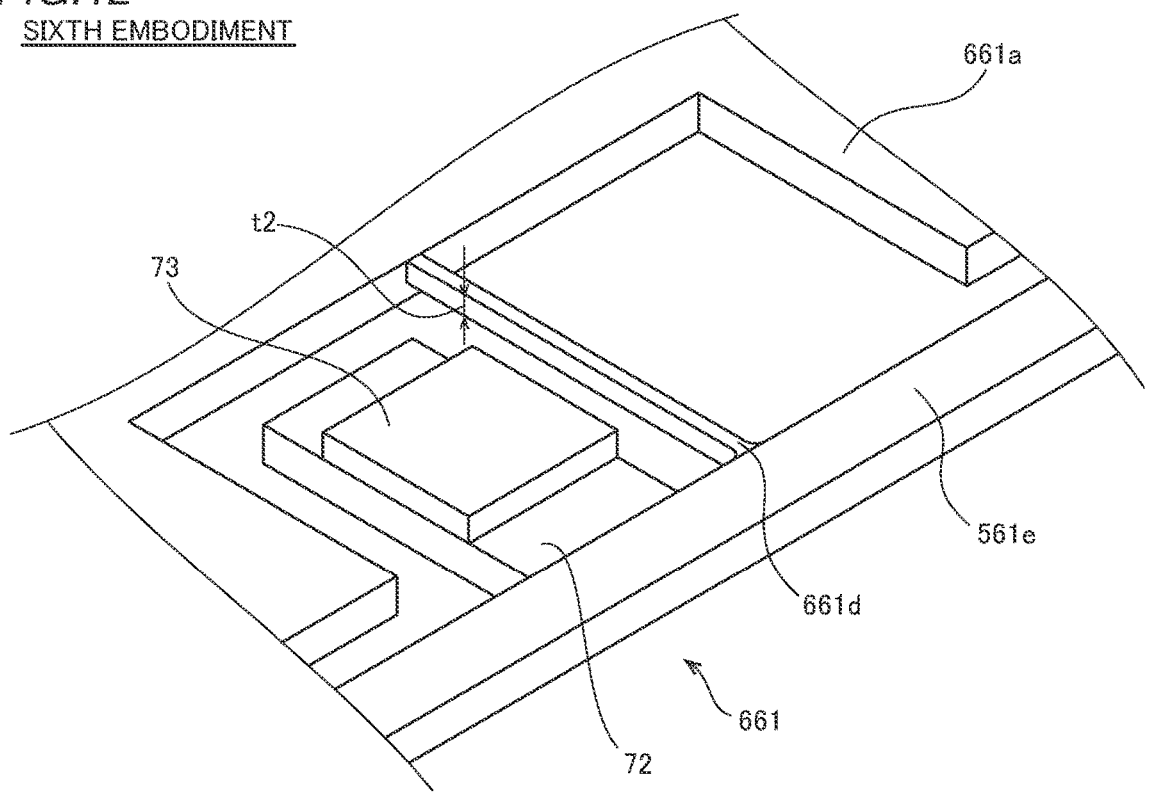
FIG. 12 is a partial enlarged view showing a vertical scanning oscillating mirror element of the projector according to the sixth embodiment of the present invention.

According to the sixth embodiment, a base 660 (a base 562c and a base 661c) of the projector 600 (see FIG. 7) includes the pair of first mirror beam portions 661d that supports a vertical scanning mirror portion 661a such that the vertical scanning mirror portion 661a is driven to be swingable about an axis α and a pair of second mirror beam portions 562d that supports a horizontal scanning mirror portion 562a such that the horizontal scanning mirror portion 562a is driven to be swingable about an axis β, as shown in FIG. 11. As shown in FIG. 12, the pair of first mirror beam portions 661d has the thickness t2 thinner than the thickness t1 (see FIG. 9) of the pair of second mirror beam portions 562d. For example, a portion (opposite to a reflective surface) of the base 660 that corresponds to the pair of first mirror beam portions 661d is half-etched, whereby the pair of first mirror beam portions 661d has the thickness t2 thinner than the thickness t1 (see FIG. 9) of the pair of second mirror beam portions 562d.

Figure 13:
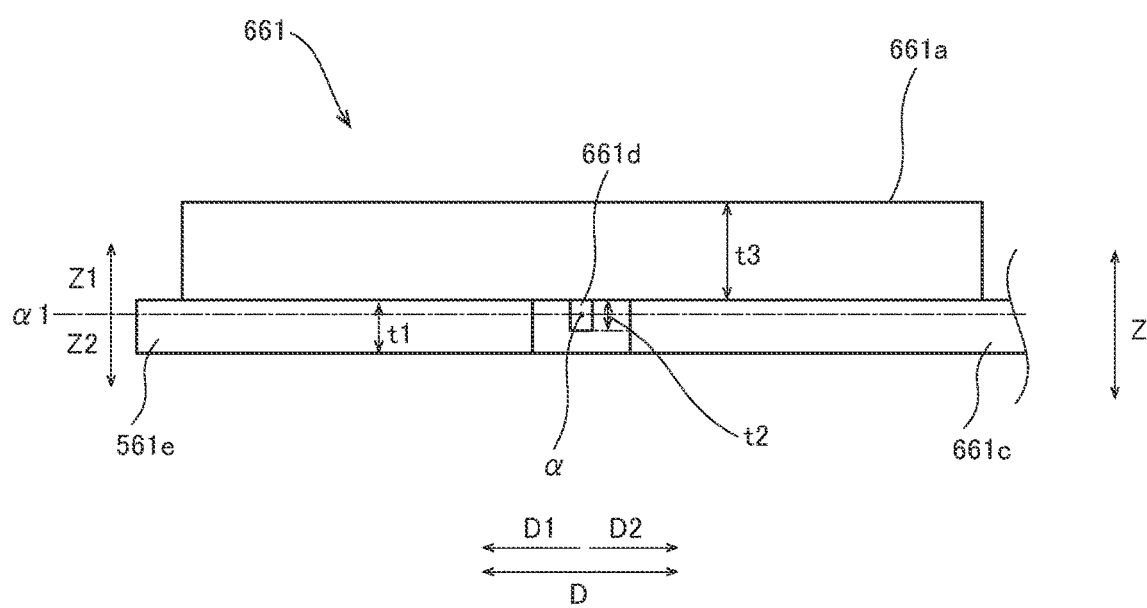
FIG. 13 is a side elevational view showing the vertical scanning oscillating mirror element of the projector according to the sixth embodiment of the present invention.

According to the sixth embodiment, the vertical scanning mirror portion 661a is configured such that the weights of a vertical scanning oscillating mirror element portion 661 including the pair of first mirror beam portions 661*d* and the vertical scanning mirror portion 661*a* at one side (Z1 direction side) and the other side (Z2 direction side) in the thickness direction (direction Z) of the base 661*c* centered on the axis α (a line α1 passing through the axis α) are substantially equal to each other, as shown in FIG. 13.

The remaining structures of the sixth embodiment are similar to those of the aforementioned fifth embodiment.

Effects of Sixth Embodiment

According to the sixth embodiment, the following effects can be obtained.

According to the sixth embodiment, as hereinabove described, the thickness t2 of the pair of first mirror beam portions 661*d* is thinner than the thickness t1 of the pair of second mirror beam portions 562*d*. Thus, when the vertical scanning oscillating mirror element portion 661 is swingably driven by resonant oscillation, the resonance frequency can be reduced simply by reducing the thickness of the pair of first mirror beam portions 661*d* without separately providing a member to reduce the resonance frequency. Consequently, the structure of the oscillating mirror element 606 can be simplified.

According to the sixth embodiment, as hereinabove described, the weights of the vertical scanning oscillating mirror element portion 661 at one side and the other side in the thickness direction of the base 661*c* centered on the axis α (the line α1 passing through the axis α) are substantially equal to each other. Thus, even when the thickness of the pair of first mirror beam portions 661*d* is reduced in order to reduce the resonance frequency, deviation between the axis α (the line α1 passing through the axis α) and the central axis of swinging of the vertical scanning oscillating mirror element portion 661 can be significantly reduced or prevented, and hence poor balance of the swinging of the vertical scanning oscillating mirror element portion 661 can be significantly reduced or prevented.

The remaining effects of the sixth embodiment are similar to those of the aforementioned fifth embodiment.

Seventh Embodiment

The structure of a projector 700 according to a seventh embodiment is now described with reference to FIG. 14. In the seventh embodiment, first drive portions 761*b* do not resonantly drive but directly drive a pair of first mirror beam portions 761*d* unlike the aforementioned fifth and sixth embodiments in which the first drive portion 561*b* resonantly drives the pair of first mirror beam portions 561*d* (the pair of first mirror beam portions 661*d*). Portions of the projector 700 similar to those of the projector 500 according to the aforementioned fifth embodiment are denoted by the same reference numerals, to omit the description.

Figure 14:
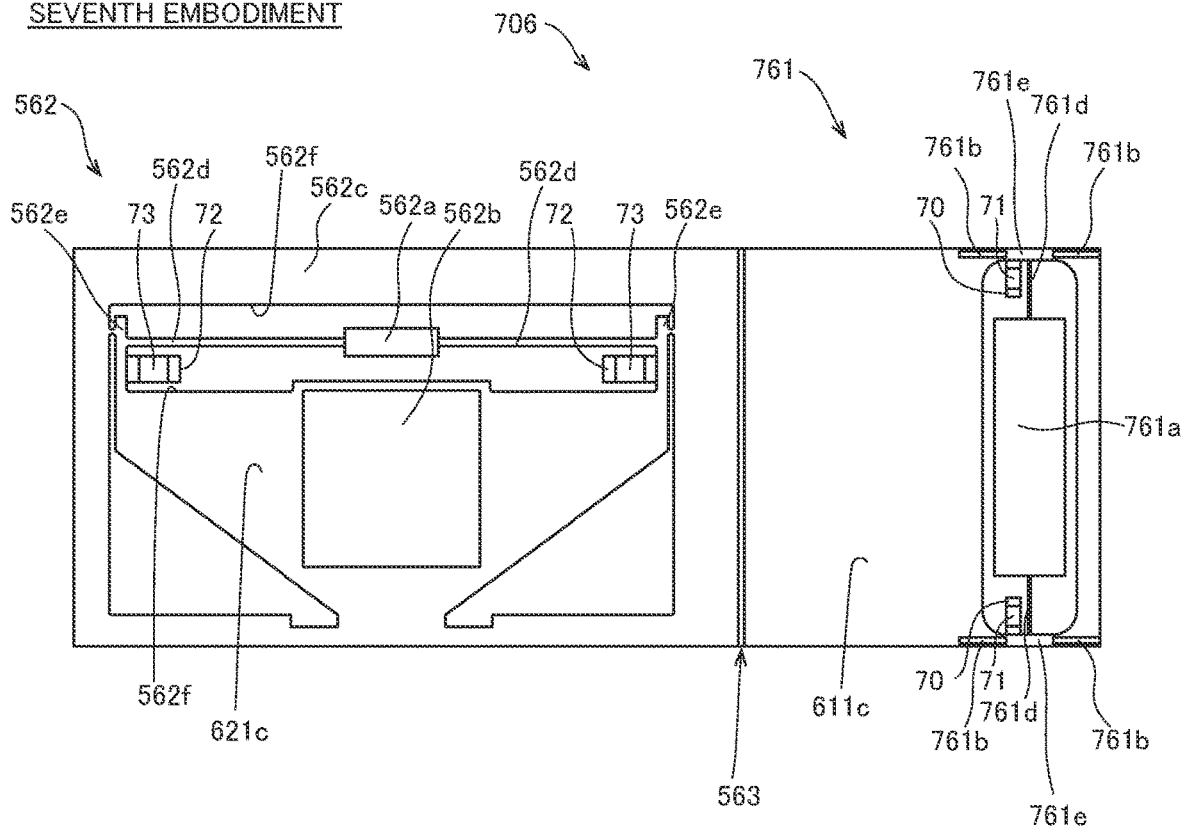
FIG. 14 is a plan view showing an oscillating mirror element of the projector according to the seventh embodiment of the present invention.

According to the seventh embodiment, a vertical scanning oscillating mirror element portion 761 of the projector 700 (see FIG. 7) includes the first drive portions 761*b* that are arranged near the pair of first mirror beam portions 761*d* that supports a vertical scanning mirror portion 761*a* such that the vertical scanning mirror portion 761*a* is swingably driven and do not resonantly drive but directly drive the pair of first mirror beam portions 761*d*, as shown in FIG. 14. Specifically, two first drive portions 761*b* are provided on each of a pair of beam support portions 761*e* that supports the pair of first mirror beam portions 761*d*.

The remaining structures of the seventh embodiment are similar to those of the aforementioned fifth embodiment.

Effects of Seventh Embodiment

According to the seventh embodiment, the following effects can be obtained.

According to the seventh embodiment, the first drive portions 761*b* are arranged near the pair of first mirror beam portions 761*d* that supports the vertical scanning mirror portion 761*a* such that the vertical scanning mirror portion 761*a* is swingably driven, and do not resonantly drive but directly drive the pair of first mirror beam portions 761*d*. Thus, the vertical scanning mirror portion 761*a* can be swung at a constant speed according to the drive frequency. Furthermore, the size of the vertical scanning mirror portion 761*a* can be further reduced with direct drive than resonant drive, and hence an oscillating mirror element 706 can be reduced in weight.

Modification

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the oscillating mirror element according to the present invention is mounted on the projector in each of the aforementioned first to seventh embodiments, the present invention is not restricted to this. According to the present invention, the oscillating mirror element according to the present invention may alternatively be mounted on an electronic device other than the projector, such as a head-up display device.

Figure 15:
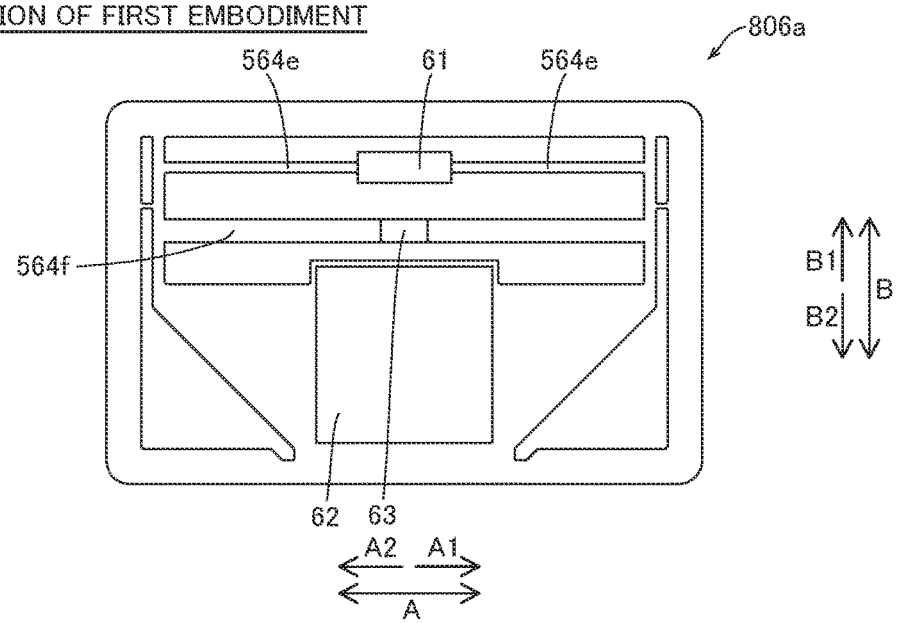
FIG. 15 is a plan view showing a horizontal scanning oscillating mirror element of a projector according to a modification of the first embodiment of the present invention.
Figure 16:
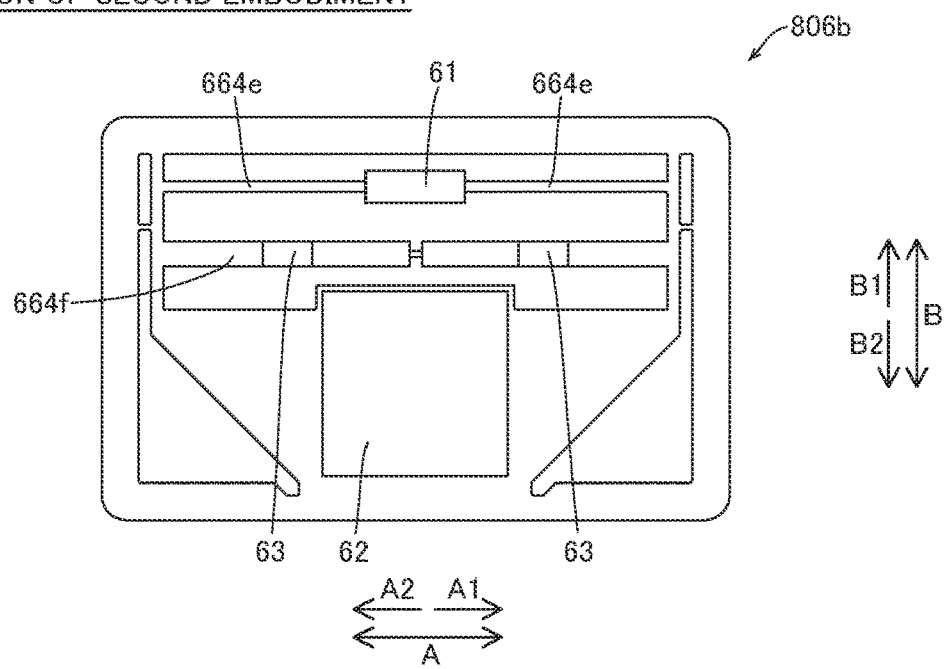
FIG. 16 is a plan view showing a horizontal scanning oscillating mirror element of a projector according to a modification of the second embodiment of the present invention.
Figure 17:
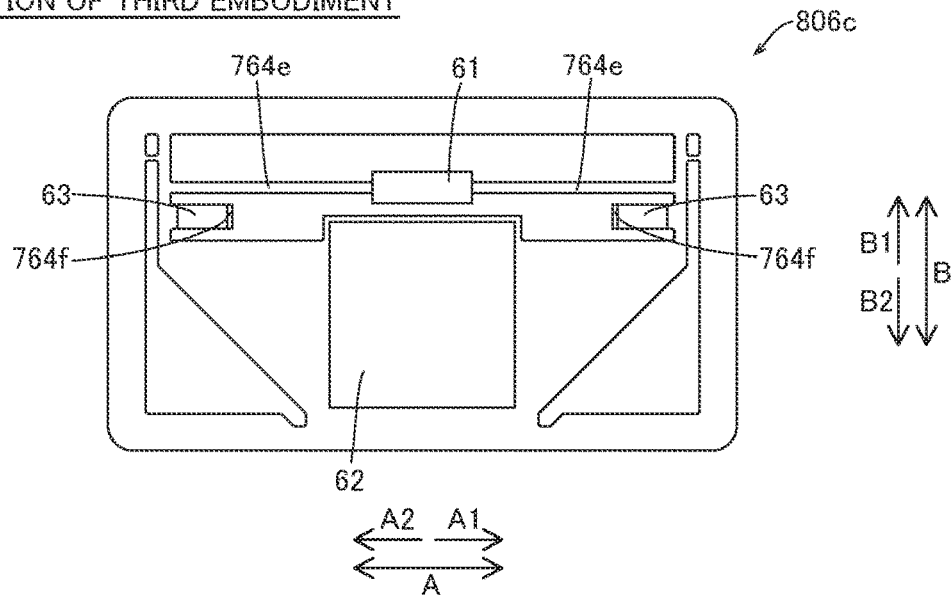
FIG. 17 is a plan view showing a horizontal scanning oscillating mirror element of a projector according to a modification of the third embodiment of the present invention.

While the mirror beam portion is arranged closer to the drive portion with respect to the sensor beam portion in each of the aforementioned first to third embodiments, the present invention is not restricted to this. As in a vertical scanning oscillating mirror element 806*a* according to a modification of the first embodiment shown in FIG. 15, for example, a sensor beam portion 564*f* may alternatively be arranged closer to a drive portion 62 with respect to a mirror beam portion 564*e*. Furthermore, as in a vertical scanning oscillating mirror element 806*b* according to a modification of the second embodiment shown in FIG. 16, a sensor beam portion 664*f* may alternatively be arranged closer to a drive portion 62 with respect to a mirror beam portion 664*e*. Moreover, as in a vertical scanning oscillating mirror element 806*c* according to a modification of the third embodiment shown in FIG. 17, a sensor beam portion 764*f* may alternatively be arranged closer to a drive portion 62 with respect to a mirror beam portion 764*e*. The vertical scanning oscillating mirror element 806*a*, 806*b*, and 806*c* are examples of an "oscillating mirror element" in the claims.

While the width of the second portion is smaller than the width of the pair of first portions in the aforementioned second embodiment, the present invention is not restricted to this. According to the present invention, the width of the second portion may alternatively be larger than the width of the pair of first portions.

While a pair of strain sensors is provided on the base in each of the aforementioned second and third embodiments, the present invention is not restricted to this. According to the present invention, only one of the pair of strain sensors may alternatively be provided on the base.

While the analyzer determines whether or not the frequency component other than the predetermined frequency component has been detected in the aforementioned fourth embodiment, the present invention is not restricted to this. According to the present invention, a determination portion may alternatively be further provided, and the determination portion may alternatively determine whether or not the frequency component other than the predetermined frequency component has been detected based on an analysis of the analyzer, for example.

While the mirror beam portion is the both-end supported beam in the aforementioned second embodiment, the present invention is not restricted to this. According to the present invention, the mirror beam portion may alternatively be a cantilever beam.

While the drive plate portion has the trapezoidal shape in each of the aforementioned first to third embodiments, the present invention is not restricted to this. The drive plate portion may alternatively have a triangular or rectangular shape, for example.

While the angle formed by the vertical scanning oscillating mirror element portion and the horizontal scanning oscillating mirror element portion is 20 degrees in each of the aforementioned fifth to seventh embodiments, the present invention is not restricted to this. According to the present invention, the angle formed by the vertical scanning oscillating mirror element portion and the horizontal scanning oscillating mirror element portion may alternatively be an acute angle other than 20 degrees.

While the base of the horizontal scanning oscillating mirror element portion is rectangular in each of the aforementioned fifth to seventh embodiments, the present invention is not restricted to this. According to the present invention, the base of the horizontal scanning oscillating mirror element portion may alternatively be shaped other than rectangular.

While the laser light passes through the opening at the F1 direction side (opposite to the drive portion) of the pair of openings, as shown in FIG. 9, in each of the aforementioned fifth to seventh embodiments, the present invention is not restricted to this. According to the present invention, the laser light may alternatively pass through the opening at the F2 direction side (closer to the drive portion) of the pair of openings, for example.

While the vertical scanning oscillating mirror element portion and the horizontal scanning oscillating mirror element portion are piezoelectrically driven in each of the aforementioned fifth to seventh embodiments, the present invention is not restricted to this. According to the present invention, the vertical scanning oscillating mirror element portion and the horizontal scanning oscillating mirror element portion may alternatively be driven other than piezoelectrically driven, such as electrostatically driven.

While the pair of openings is provided adjacent to the horizontal scanning mirror portion or the pair of second mirror beam portions in each of the aforementioned fifth to seventh embodiments, the present invention is not restricted to this. According to the present invention, the pair of openings may not be provided adjacent to the horizontal scanning mirror portion or the pair of second mirror beam portions.

While the vertical scanning mirror portion and the horizontal scanning mirror portion are made of silicon in each of the aforementioned fifth to seventh embodiments, the present invention is not restricted to this. According to the present invention, the vertical scanning mirror portion and the horizontal scanning mirror portion may alternatively be made of a material other than silicon, for example.

While the thickness of the pair of first mirror beam portions of the vertical scanning oscillating mirror element portion is adjusted by half-etching the portion opposite to the reflective surface, as shown in FIG. 11, in the aforementioned sixth embodiment, the present invention is not restricted to this. According to the present invention, the thickness of the pair of first mirror beam portions of the vertical scanning oscillating mirror element portion may alternatively be adjusted by half-etching a portion closer to the reflective surface, for example.

What is claimed is:

1. An oscillating mirror element comprising:
a mirror portion;
a drive portion that drives the mirror portion;
a strain sensor capable of detecting an amount of displacement of the mirror portion; and
a base including a mirror beam portion provided with the mirror portion, a sensor beam portion provided with the strain sensor, and a body portion that supports the mirror beam portion and the sensor beam portion and is provided with the drive portion, wherein
the mirror beam portion is arranged parallel or substantially parallel to the sensor beam portion,
the body portion of the base includes a pair of parallel beam support portions that supports, respectively, a first end and a second end of the mirror beam portion and a first end and a second end of the sensor beam portion,
the pair of parallel beam support portions is opposed to each other in a longitudinal direction of the mirror beam portion and the sensor beam portion,
the pair of parallel beam support portions is perpendicular or substantially perpendicular to each of the mirror beam portion and the sensor beam portion,
the body portion of the base includes an outer frame portion which surrounds the mirror beam portion, the sensor beam portion, and the pair of parallel beam support portions, and
the outer frame portion is at least partially spaced apart from the pair of parallel beam support portions.

2. The oscillating mirror element according to claim 1, wherein
the pair of parallel beam support portions has first ends extending toward the drive portion and second ends connected to the outer frame portion.

3. The oscillating mirror element according to claim 1 wherein
in a direction in which the mirror beam portion and the sensor beam portion are aligned, a width of the mirror beam portion is narrower than a width of the sensor beam portion.

4. The oscillating mirror element according to claim 1, wherein
the mirror portion and the strain sensor are arranged such that central positions thereof substantially coincide with each other in a direction in which the mirror beam portion extends.

5. The oscillating mirror element according to claim 1, wherein
the sensor beam portion includes a cantilever beam arranged substantially parallel to the mirror beam portion, and
a length of the cantilever beam in a direction in which the cantilever beam extends is shorter than a length of the mirror beam portion to the mirror portion.

6. The oscillating mirror element according to claim 5, wherein
the length of the cantilever beam is not more than one half of the length of the mirror beam portion to the mirror portion.

7. The oscillating mirror element according to claim 1, wherein
the mirror beam portion is arranged closer to the drive portion with respect to the sensor beam portion.

8. The oscillating mirror element according to claim 1, wherein
the sensor beam portion includes a pair of first portions and a second portion that connects the pair of first portions to each other and has a width different from a width of the pair of first portions.

9. The oscillating mirror element according to claim 8, wherein
in a direction in which the mirror beam portion and the sensor beam portion are aligned, the width of the pair of first portions is wider than the width of the second portion.

10. The oscillating mirror element according to claim 1, wherein
the mirror beam portion, the sensor beam portion, and the body portion that supports the mirror beam portion and the sensor beam portion and is provided with the drive portion are formed of a single member.

11. The oscillating mirror element according to claim 1, wherein
the mirror portion includes a first mirror portion that receives and reflects light from a light source portion and is driven to be swingable about a first axis and a second mirror portion that receives and reflects the light from the first mirror portion and is driven to be swingable about a second axis that extends in a direction substantially perpendicular to the first axis,
the oscillating mirror element further comprising a first oscillating mirror element portion that includes the first mirror portion and a second oscillating mirror element portion that includes the second mirror portion, wherein
the base includes a first surface provided with the first oscillating mirror element portion and a second surface provided with the second oscillating mirror element portion, and
the mirror beam portion, the sensor beam portion, and the body portion are provided in at least one of the first oscillating mirror element portion and the second oscillating mirror element portion.

12. The oscillating mirror element according to claim 11, wherein
a fold angle between the first surface and the second surface of the base is an acute angle.

13. The oscillating mirror element according to claim 12, wherein
the base is provided with a fold line to fold the base along a direction substantially parallel to the first axis.

14. The oscillating mirror element according to claim 12, wherein
the mirror beam portion includes a first mirror beam portion that supports the first mirror portion such that the first mirror portion is driven to be swingable about the first axis and a second mirror beam portion that supports the second mirror portion such that the second mirror portion is driven to be swingable about the second axis, and
a thickness of the first mirror beam portion is thinner than a thickness of the second mirror beam portion.

15. The oscillating mirror element according to claim 14, wherein
weights of the first oscillating mirror element portion at one side and the other side in a thickness direction of the base centered on the first axis are substantially equal to each other.

16. The oscillating mirror element according to claim 12, wherein
the mirror beam portion includes a first mirror beam portion that supports the first mirror portion such that the first mirror portion is driven to be swingable about the first axis,
the base is provided with a fold line to fold the base along a direction substantially parallel to the first axis,
the drive portion includes a first drive portion placed on the first oscillating mirror element portion and arranged between the fold line and the first mirror portion and a second drive portion placed on the second oscillating mirror element portion, and
the first drive portion resonantly drives the first mirror beam portion.

17. The oscillating mirror element according to claim 12, wherein
the mirror beam portion includes a first mirror beam portion that supports the first mirror portion such that the first mirror portion is driven to be swingable about the first axis,
the drive portion includes a first drive portion placed on the first oscillating mirror element portion and a second drive portion placed on the second oscillating mirror element portion, and
the first drive portion is arranged near the first mirror beam portion that supports the first mirror portion such that the first mirror portion is swingably driven, and does not resonantly drive but directly drives the first mirror beam portion.

18. The oscillating mirror element according to claim 12, wherein
the base includes an opening provided near the second mirror portion, and
the light from the light source portion passes through the opening from a surface side of the second oscillating mirror element portion opposite to a surface on which the second mirror portion is provided to be irradiated to the first mirror portion, and the light reflected by the first mirror portion is directly irradiated to the second mirror portion.

19. A projector comprising:
a light source portion;
a mirror portion that reflects projection light from the light source portion;
a drive portion that drives the mirror portion;
a strain sensor capable of detecting an amount of displacement of the mirror portion; and
a base including a mirror beam portion provided with the mirror portion, a sensor beam portion provided with the strain sensor, and a body portion that supports the mirror beam portion and the sensor beam portion and is provided with the drive portion, wherein
the mirror beam portion is arranged parallel or substantially parallel to the sensor beam portion,
the body portion of the base includes a pair of parallel beam support portions that supports, respectively, a first end and a second end of the mirror beam portion and a first end and a second end of the sensor beam portion, the pair of parallel beam support portions is opposed to each other in a longitudinal direction of the mirror beam portion and the sensor beam portion, the pair of parallel beam support portions is perpendicular or substantially perpendicular to each of the mirror beam portion and the sensor beam portion, the body portion of the base includes an outer frame portion which surrounds the mirror beam portion, the sensor beam portion, and the pair of parallel beam support portions, and the outer frame portion is at least partially spaced apart from the pair of parallel beam support portions.

20. The projector according to claim 19, further comprising an analyzer that analyzes a frequency component of a detection signal detected by the strain sensor, the projector that stops emission of the projection light from the light source portion when a frequency component other than a predetermined frequency component is detected in the analyzer.

21. The projector according to claim 19, wherein the mirror portion includes a first mirror portion that receives and reflects the projection light from the light source portion and is driven to be swingable about a first axis and a second mirror portion that receives and reflects the projection light from the first mirror portion and is driven to be swingable about a second axis that extends in a direction substantially perpendicular to the first axis, the projector further comprising a first oscillating mirror element portion that includes the first mirror portion and a second oscillating mirror element portion that includes the second mirror portion, wherein the base includes a first surface provided with the first oscillating mirror element portion and a second surface provided with the second oscillating mirror element portion, and the mirror beam portion, the sensor beam portion, and the body portion are provided in at least one of the first oscillating mirror element portion and the second oscillating mirror element portion.

22. The projector according to claim 21, wherein a fold angle between the first surface and the second surface of the base is an acute angle.

* * * * *